United States Patent
Kondo et al.

[19]

[11] Patent Number: 6,160,845
[45] Date of Patent: Dec. 12, 2000

[54] PICTURE ENCODING DEVICE, PICTURE ENCODING METHOD, PICTURE DECODING DEVICE, PICTURE DECODING METHOD, AND RECORDING MEDIUM

[75] Inventors: Tetsujiro Kondo; Kenji Takahashi, both of Tokyo, Japan

[73] Assignee: Sony Corporation, Tokyo, Japan

[21] Appl. No.: 09/136,148

[22] Filed: Aug. 18, 1998

Related U.S. Application Data

[63] Continuation of application No. PCT/JP97/04913, Dec. 26, 1997.

[30] Foreign Application Priority Data

Dec. 26, 1996 [JP] Japan .................................. 8-347309

[51] Int. Cl.[7] .................................................. H04B 1/66
[52] U.S. Cl. .......................... 375/240; 348/427; 348/429; 348/437; 348/438; 348/399; 348/432; 348/408
[58] Field of Search .................................. 348/395–399, 348/408, 415, 411, 432, 427, 429, 437, 438; 375/240; H04N 7/17

[56] References Cited

U.S. PATENT DOCUMENTS

| | | | |
|---|---|---|---|
| 4,951,138 | 8/1990 | Hemot | 348/429 |
| 5,021,880 | 6/1991 | Graves et al. | 348/411 |
| 5,541,658 | 7/1996 | Ishiwata | 348/415 |
| 5,666,164 | 9/1997 | Kondo et al. | 348/441 |
| 5,677,981 | 10/1997 | Kato et al. | 348/427 |
| 5,912,708 | 6/1999 | Kondo et al. | 348/415 |
| 5,946,044 | 8/1999 | Kondo et al. | 248/458 |

FOREIGN PATENT DOCUMENTS

| | | | |
|---|---|---|---|
| 0533 195 A2 | 3/1993 | European Pat. Off. . | |
| 0 635 978 A1 | 1/1995 | European Pat. Off. . | |
| WO 96/08928 | 3/1996 | European Pat. Off. . | |
| 63-48088 | 2/1988 | Japan | H04N 7/13 |
| 2-65372 | 3/1990 | Japan | H04N 1/417 |
| 3-6185 | 1/1991 | Japan | H04N 7/137 |
| 3-35678 | 2/1991 | Japan | H04N 7/137 |
| 5-506975 | 10/1993 | Japan | H04N 7/137 |
| 7-46548 | 2/1995 | Japan | H04N 7/015 |
| 7-79418 | 3/1995 | Japan | H04N 7/01 |
| 7-95591 | 4/1995 | Japan | H04N 7/32 |
| 7-154642 | 6/1995 | Japan | H04N 5/14 |
| 8-46934 | 2/1996 | Japan | H04N 7/015 |
| 8-51598 | 2/1996 | Japan | H04N 7/01 |
| 8-84335 | 3/1996 | Japan | H04N 7/24 |
| 8-84336 | 3/1996 | Japan | H04N 7/24 |

*Primary Examiner*—Vu Le
*Assistant Examiner*—Luanne P. Din
*Attorney, Agent, or Firm*—Limbach & Limbach, LLP

[57] ABSTRACT

A compressed picture signal having a number of pixels smaller than the number of pixels of an original picture signal is generated, and plural patterns of prediction pixels are formed by using neighboring pixels of as notable pixel which is one of pixels constituting the compressed picture signal. The original picture signal is predicted from each of the plural patterns of prediction pixels and a predetermined prediction coefficient, and each of prediction values with respect to the plural patterns of prediction pixels is outputted. A prediction error of each of the prediction values of the plural patterns of prediction pixels with respect to the original picture signal is calculated, and a pattern code corresponding to a prediction pixel with which a minimum prediction error is obtained, among the plural patterns of prediction pixels, is appended to the pixel value of the notable pixel.

55 Claims, 27 Drawing Sheets

IN CASE OF LUMINANCE SIGNAL

IN CASE OF COLOR-DIFFERENCE SIGNAL

PICTURE ENCODING DEVICE, PICTURE ENCODING METHOD, PICTURE DECODING DEVICE, PICTURE DECODING METHOD, AND RECORDING MEDIUM

This application is a continuation of international application number PCT JP/97/04913, filed Dec. 26, 1997, now pending.

TECHNICAL FIELD

This invention relates to a picture encoding device, a picture encoding method, a picture decoding device, a picture decoding method, and a recording medium. Particularly, it relates to a picture encoding device, a picture encoding method, a picture decoding device, a picture decoding method, and a recording medium adapted for thinning and compression-coding a picture so that a decoded picture substantially equivalent to an original picture may be provided.

BACKGROUND ART

In the case where a picture of standard resolution or low resolution (hereinafter referred to as an SD picture) is to be converted to a picture of high resolution (hereinafter referred to as an HD picture) or in the case where a picture is to be enlarged, the pixel value of a lacked pixel is interpolated (compensated) by a so-called interpolation filter.

However, since a component (high-frequency component) of the HD picture which is not included in the SD picture cannot be restored even by carrying out interpolation of a pixel by the interpolation filter, it has been difficult to provide a picture of high resolution.

Thus, the present Assignee has proposed a picture converting device (picture converting circuit) for converting an SD picture to an HD picture which also includes a high-frequency component not included in the SD picture.

In this picture converting device, adaptive processing for finding a prediction value of a pixel of the HD picture is carried out by linear combination of the SD picture and a predetermined prediction coefficient, thereby restoring the high-frequency component not included in the SD picture.

Specifically, it is now assumed that, for example, a prediction value E[y] of a pixel value y of a pixel constituting the HD picture (hereinafter referred to as an HD pixel) is to be found from a linear primary combination model prescribed by linear combination of pixel values (hereinafter referred to as learning data) $x_1, x_2, \ldots$ of several SD pixels (pixels constituting the SD picture) and predetermined prediction coefficients $w_1, w_2, \ldots$. In this case, the prediction value E[y] may be expressed by Equation 1.

$$E[y] = w_1 x_1 + w_2 x_2 + \quad \text{Equation 1}$$

If a matrix W consisting of a set of prediction coefficients w is defined by Equation 2, and a matrix X consisting of a set of learning data is defined by Equation 3 while a matrix Y' consisting of a set of prediction values E[y] is defined by Equation 4, in order to generalize the model, an observational equation like Equation 5 is obtained.

$$X = \begin{bmatrix} x_{11} & x_{12} & \ldots & x_{1n} \\ x_{21} & x_{22} & \ldots & x_{2n} \\ \ldots & \ldots & \ldots & \ldots \\ x_{m1} & x_{m2} & \ldots & x_{mn} \end{bmatrix} \quad \text{Equation 2}$$

$$W = \begin{bmatrix} w_1 \\ w_2 \\ \ldots \\ w_n \end{bmatrix} \quad \text{Equation 3}$$

$$Y' = \begin{bmatrix} E[y_1] \\ E[y_2] \\ \ldots \\ E[y_m] \end{bmatrix} \quad \text{Equation 4}$$

$$XW = Y' \quad \text{Equation 5}$$

Then, it is assumed that a prediction value E[y] proximate to a pixel value y of the HD pixel is to be found by applying a minimum square method to the observational equation. In this case, if a matrix Y consisting of true pixel values y of the HD pixels to be teacher data is defined by Equation 6 while a matrix E consisting of residuals e of the prediction values E[y] with respect to the pixel values y of the HD pixels is defined by Equation 7, a residual equation like Equation 8 is obtained from Equation 5.

$$Y = \begin{bmatrix} y_1 \\ y_2 \\ \ldots \\ y_m \end{bmatrix} \quad \text{Equation 6}$$

$$Y = \begin{bmatrix} y_1 \\ y_2 \\ \ldots \\ y_m \end{bmatrix} \quad \text{Equation 7}$$

$$XW = Y + E \quad \text{Equation 8}$$

In this case, a prediction coefficient $w_i$ for finding the prediction value E[y] proximate to the pixel value y of the HD pixel may be found by minimizing the square error expressed by Formula 9.

$$\sum_{i=1}^{m} e_i^2 \quad \text{Formula 9}$$

Therefore, if the value obtained by differentiating the square error of Formula 9 by the prediction coefficient $w_i$ is 0, the prediction value $w_i$ satisfying Equation 10 is the optimum value for finding the prediction value E[y] proximate to the pixel value y of the HD pixel.

$$e_1 \frac{\partial e_1}{\partial w_i} + e_2 \frac{\partial e_2}{\partial w_i} + \ldots + e_m \frac{\partial e_m}{\partial w_i} = 0 \quad (i = 1, 2, \ldots, n) \quad \text{Equation 10}$$

Thus, by differentiating Equation 8 by the prediction coefficient $w_i$, Equation 11 is obtained.

$$\frac{\partial e_i}{\partial w_1} = x_{i1}, \frac{\partial e_i}{\partial w_2} = x_{i2}, \ldots + \frac{\partial e_i}{\partial w_n} = x_{in} \quad (i = 1, 2, \ldots, m) \quad \text{Equation 11}$$

Equation 12 is obtained from Equations 10 and 11.

$$\sum_{i=1}^{m} e_i x_{i1} = 0, \sum_{i=1}^{m} e_1 x_{i2} = 0, \ldots, \sum_{i=1}^{m} e_i x_{in} = 0 \quad \text{Equation 12}$$

In addition, in consideration of the relation between the learning data x, the prediction coefficient w, the teacher data y and the residual e in the residual equation of Equation 8, a normal equation like Equation 13 may be obtained from Equation 12.

$$\left(\sum_{i=1}^{m} x_{i1} x_{i1}\right) w_1 + \left(\sum_{i=1}^{m} x_{i1} x_{i2}\right) w_2 + \ldots + \left(\sum_{i=1}^{m} x_{i1} x_{in}\right) w_n = \sum_{i=1}^{m} x_{i1} y_i$$

$$\left(\sum_{i=1}^{m} x_{i2} x_{i1}\right) w_1 + \left(\sum_{i=1}^{m} x_{i2} x_{i2}\right) w_2 + \ldots + \left(\sum_{i=1}^{m} x_{i2} x_{in}\right) w_n = \sum_{i=1}^{m} x_{i2} y_i$$

$$\ldots$$

$$\left(\sum_{i=1}^{m} x_{in} x_{i1}\right) w_1 + \left(\sum_{i=1}^{m} x_{in} x_{i2}\right) w_2 + \ldots + \left(\sum_{i=1}^{m} x_{in} x_{in}\right) w_n = \sum_{i=1}^{m} x_{in} y_i$$

The normal equation of Equation 13 may be established for the same number as the number of prediction coefficients w to be found. Therefore, the optimum prediction coefficient w may be found by solving Equation 13. (However, to solve Equation 13, the matrix consisting of the coefficients according to the prediction coefficients w must be regular.) In solving Equation 13, for example, a sweep method (Gauss-Jordan elimination method) may be applied.

In the foregoing manner, the set of optimum prediction coefficients w is found. Then, by using this set of prediction coefficients w, the prediction value E[y] proximate to the pixel value y of the HD pixel is found by Equation 1. The foregoing processing is adaptive processing. (Adaptive processing includes processing to find the set of prediction coefficients w in advance and find the prediction value from the set of prediction coefficients w.)

Adaptive processing differs from interpolation processing in that a component included in the HD picture which is not included in the SD picture is reproduced. Specifically, though adaptive processing is equal to interpolation processing using the so-called interpolation filter as far as Equation 1 is concerned, the prediction coefficient w corresponding to the tap coefficient of the interpolation filter is found from so-called learning by using teacher data y, thus enabling reproduction of the component included in the HD picture. That is, a picture of high resolution may be easily obtained. This indicates that adaptive processing is processing which has a picture creation effect.

FIG. 22 shows an example of the structure of a picture converting device for converting an SD picture into an HD picture by adaptive processing as described above based on the characteristics (class) of the picture.

The SD picture is supplied to a classifying circuit 101 and a delay circuit 102. The classifying circuit 101 sequentially uses SD pixels constituting the SD picture as notable pixels, and classifies the notable pixels into predetermined classes.

The classifying circuit 101 first forms a block (hereinafter referred to as a processing block) by collecting several SD pixels around a notable pixel, and supplies a value allocated in advance to a pattern of pixel value of all the SD pixels constituting the processing block, as the class of the notable pixel, to an address terminal (AD) of a coefficient ROM 104.

Specifically, the classifying circuit 101 extracts, for example, a processing block made up of 5×5 SD pixels (indicated by ○ in FIG. 23) around a notable pixel from the SD picture, as indicated by a rectangle of dotted line, and outputs a value corresponding to a pattern of pixel value of these 25 SD pixels as the class of the notable pixel.

To express the pixel value of each SD pixel, the number of patterns of pixel values of the 25 SD pixels is extremely large such as $(2^8)^{25}$ patterns in the case where a large number of bits like eight bits are allocated. Therefore, the subsequent processing cannot be made quick.

Thus, as preprocessing prior to classification, processing for reducing the number of bits of the SD pixels constituting Equation 13 the processing block, for example, ADRC (Adaptive Dynamic Range Coding) processing, is carried out on the processing block.

In ADRC processing, first, an SD pixel having the maximum pixel value (hereinafter referred to as a maximum pixel) and an SD pixel having the minimum pixel value (hereinafter referred to as a minimum pixel) are detected from among the 25 SD pixels constituting the processing block. Then, the difference DR between the pixel value MAX of the maximum pixel and the pixel value MIN of the minimum pixel (=MAX−MIN) is calculated, and this DR is used as a local dynamic range of the processing block. On the basis of the dynamic range DR, the value of each pixel constituting the processing block is re-quantized to K bits which is smaller than the original number of allocated bits. That is, the pixel value MIN of the minimum pixel is subtracted from the pixel value of each pixel constituting the processing block, and each subtraction value is divided by $DR/2^K$.

As a result, the value of each pixel constituting the processing block is expressed by K bits. Therefore, if K=1, the number of patterns of pixel values of the 25 SD pixels is $(2^1)^{25}$, which is much smaller than the number of patterns in the case where ADRC processing is not carried out. ADRC processing for expressing the pixel value by K bits is hereinafter referred to as K-bit ADRC processing.

The coefficient ROM 104 stores, every class, a set of prediction coefficients found by learning in advance. When a class is supplied from the classifying circuit 101, the coefficient ROM 104 reads out a set of prediction coefficients stored at an address corresponding to the class, an supplies the read-out set of prediction coefficients to a prediction processing circuit 105.

Meanwhile, the delay circuit 102 delays the SD picture only by a time necessary for causing a timing at which the set of prediction coefficients are supplied from the coefficient ROM 104 and a timing at which a prediction tap is supplied from a prediction tap generating circuit 103, as later described, to coincide with each other. The delay circuit 102 then supplies the delayed SD picture to the prediction tap generating circuit 103.

The prediction tap generating circuit 103 extracts, from the SD picture supplied thereto, an SD pixel used for finding a prediction value of a predetermined HD pixel in the prediction processing circuit 105, and supplies the extracted SD pixel as a prediction tap to the prediction processing circuit 105. That is, the prediction tap generating circuit 103 extracts, from the SD picture, the same processing block as the processing block extracted by the classifying circuit 101, and supplies the SD pixels constituting the processing block as the prediction tap to the prediction processing circuit 105.

The prediction processing circuit 105 carries out arithmetic processing of Equation 1, that is, adaptive processing using the prediction coefficients $w_1$, $w_2$, . . . and the prediction taps $x_1$, $x_2$, . . . , thereby finding the prediction value $E[y]$ of the notable pixel y. The prediction processing circuit 105 outputs this prediction value as the pixel value of the HD pixel.

For example, the prediction value of an HD pixel of 3×3 pixels (indicated by points ● in FIG. 23) around the notable pixel, surrounded by a rectangle of solid line in FIG. 23, is found from one prediction tap. In this case, the prediction processing circuit 105 carries out arithmetic processing of Equation 1 with respect to the nine HD pixels. Therefore, the coefficient ROM 104 stores nine sets of prediction coefficients at an address corresponding to one class.

Similar processing is carried out by using the other SD pixels as notable pixels. Thus, the SD picture is converted to the HD picture.

FIG. 24 shows an example of the structure of a learning device for carrying out learning for calculating a set of prediction coefficients of every class which is to be stored in the coefficient ROM 104 of FIG. 22.

The HD picture to be teacher data y in learning is supplied to a thinning circuit 111 and a delay circuit 114. The thinning circuit 111 reduces the number of pixels of the HD picture by thinning, thus forming an SD picture. This SD picture is supplied to a classifying circuit 112 and a prediction tap generating circuit 113.

The classifying circuit 112 and the prediction tap generating circuit 113 carry out processing similar to the processing by the classifying circuit 101 and the prediction tap generating circuit 103 of FIG. 22, thus outputting the class of a notable pixel and a prediction tap, respectively. The class outputted by the classifying circuit 112 is supplied to address terminals (AD) of a prediction tap memory 115 and a teacher data memory 116. The prediction tap outputted by the prediction tap generating circuit 113 is supplied to the prediction tap memory 115.

The prediction tap memory 115 stores the prediction tap supplied from the prediction tap generating circuit 113, at an address corresponding to the class supplied from the classifying circuit 112.

Meanwhile, the delay circuit 114 delays the HD picture only by a time during which the class corresponding to the notable pixel is supplied from the classifying circuit 112 to the teacher data memory 116. The delay circuit 114 supplies only the pixel values of the HD pixels having the positional relation of FIG. 23 with respect to the prediction tap, as teacher data, to the teacher data memory 116.

The teacher data memory 116 stores the teacher data supplied from the delay circuit 114, at an address corresponding to the class supplied from the classifying circuit 112.

Similar processing is repeated until all the SD pixels constituting the SD pictures obtained from all the HD pictures prepared for learning are used as notable pixels.

Thus, at the same address in the prediction tap memory 115 or the teacher data memory 116, SD pixels having the same positional relation as the SD pixels indicated by 0 in FIG. 23 or HD pixels having the same positional relation as the HD pixels indicated by * are stored as learning data x or teacher data y.

In the prediction tap memory 115 and the teacher data memory 116, plural pieces of information may be stored at the same address. Therefore, at the same address, plural learning data x and teacher data y classified into the same class may be stored.

After that, the arithmetic circuit 117 reads out the prediction tap as the learning data or the pixel values of the HD pixels as the teacher data, stored at the same address in the prediction tap memory 115 or the teacher data memory 116, and calculates a set of prediction coefficients for minimizing an error between the prediction value and the teacher data by a minimum square method using the read-out data. That is, the arithmetic circuit 117 establishes the normal equation of Equation 13 for every class and solves this equation to find a set of prediction coefficients for every Thus, the set of prediction coefficients for every class found by the arithmetic circuit 117 is stored at an address corresponding to the class in the coefficient ROM 104 of FIG. 22.

In learning processing as described above, in some cases, a class such that a necessary number of normal equations for finding a set of prediction coefficients cannot be obtained is generated. With respect to such class, a set of prediction coefficients obtained by establishing and solving normal equations while ignoring the class is used as a so-called default set of prediction coefficients.

With the picture converting device of FIG. 22, from the SD picture obtained by reducing the number of pixels of the HD picture by thinning, the HD picture including high-frequency components not included in the SD picture may be obtained as described above. However, the proximity to the original HD picture is limited for the following reason. That is, it is considered that the pixel value of the pixel (SD pixel) of the SD picture obtained only by thinning the number of pixels of the HD picture is not optimum for restoring the original HD picture.

Thus, the present Assignee has proposed picture compression (coding) utilizing adaptive processing in order to obtain a decoded picture of quality proximate to that of the original HD picture (for example, in the JP Patent Application No.Hei 8-206552).

Specifically, FIG. 25 shows an example of the structure of a picture encoding device for compression (coding) the an original HD picture to an optimum SD picture so as to obtain a decoded picture proximate to the original HD picture by adaptive processing.

The HD picture as an encoding target is supplied to a thinning section 121 and an error calculating section 43.

The thinning section 121 makes an SD picture from the HD picture simply by thinning the HD picture, and supplies the SD picture to a correcting section 41. On receiving the SD picture from the thinning section 121, the correcting section 41, at first, directly outputs the SD picture to a local decode section 122. The local decode section 122 has a structure similar to that of the picture converting device of FIG. 22, for example. By carrying out adaptive processing as described above by using the SD picture from the correcting section 41, the local decode section 122 calculates a prediction value of the HD pixel and outputs the prediction value to the error calculating section 43. The error calculating section 43 calculates a prediction error (error information) of the prediction value of the HD pixel from the local decode section 122 with respect to the original HD pixel, and outputs the prediction error to a control section 44. The control section 44 controls the correcting section 41 in response to the prediction error from the error calculating section 43.

Thus, the correcting section 41 corrects the pixel value of the SD picture from the thinning section 121 under the control of the control section 44, and outputs the corrected pixel value to the local decode section 122. The local decode section 122 again finds a prediction value of the HD picture by using the corrected SD picture supplied from the correcting section 41.

Similar processing is repeated, for example, until the prediction error outputted from the error calculating section 43 reaches a predetermined value or less.

When the prediction error outputted from the error calculating section 43 reaches the predetermined value or less, the control section 44 controls the correcting section 41 so as to output the corrected SD picture at the time when the prediction error reaches the predetermined value or less, as an optimum encoding result of the HD picture.

Thus, by carrying out adaptive processing on this corrected SD picture, an HD picture having a prediction error at the predetermined value or less may be obtained.

The SD picture thus outputted from the picture encoding device of FIG. 25 may be regarded as the optimum SD picture for obtaining a decoded picture proximate to the original HD picture. Therefore, the processing carried out in a system constituted by the correcting section 41, the local decode section 122, the error calculating section 43 and the control section 44 of the picture encoding device may be referred to as optimization processing.

Meanwhile, adaptive processing is for constituting the prediction tap with SD pixels around the HD pixel and finding the prediction value of the HD pixel by using the prediction tap. The SD pixels used as the prediction tap are selected regardless of the picture.

That is, in the prediction tap generating circuit 103 of the picture converting device of FIG. 22 and the local decode section 122 of FIG. 25 constituted similarly to the picture converting device, a constant pattern of prediction tap is constantly generated or formed.

However, in many cases, the picture locally differs in characteristics. As the characteristics differ, it is considered that adaptive processing should be carried out by using prediction taps corresponding the different characteristics so as to obtain a decoded picture more proximate to the picture quality of the original HD picture.

DISCLOSURE OF THE INVENTION

In view of the foregoing status of the art, it is an object of this invention to enable realization of a decoded picture of further improved quality.

A picture encoding device for encoding a picture signal according to the present invention includes: a compressing section for generating a compressed picture signal having a number of pixels smaller than the number of pixels of an original picture signal; a first forming section for forming plural patterns of prediction pixels by using neighboring pixels of a notable pixel which is one of pixels constituting the compressed picture signal; a first predicting section for predicting the original picture signal from each of the plural patterns of prediction pixels and a predetermined prediction coefficient and outputting each of prediction values with respect to the plural patterns of prediction pixels; a first calculating section for calculating a prediction error of each of the prediction values of the plural patterns of prediction pixels with respect to the original picture signal; and an appending section for appending a pattern code corresponding to a prediction pixel with which a minimum prediction error is obtained, among the plural patterns of prediction pixels, to the pixel value of the notable pixel.

A picture encoding method for encoding a picture signal according to the present invention includes: a compression step of generating a compressed picture signal having a number of pixels smaller than the number of pixels of an original picture signal; a first formation step of forming plural patterns of prediction pixels by using neighboring pixels of a notable pixel which is one of pixels constituting the compressed picture signal; a first prediction step of predicting the original picture signal from each of the plural patterns of prediction pixels and a predetermined prediction coefficient and outputting each of prediction values with respect to the plural patterns of prediction pixels; a first calculation step of calculating a prediction error of each of the prediction values of the plural patterns of prediction pixels with respect to the original picture signal; and an appending step of appending a pattern code corresponding to a prediction pixel with which a minimum prediction error is obtained, among the plural patterns of prediction pixels, to the pixel value of the notable pixel.

A picture decoding device for decoding a compressed picture signal to an original picture signal according to the present invention includes: a receiving section for receiving the compressed picture signal; a forming section for forming a prediction picture of a pattern corresponding to a pattern code appended to a pixel value of a notable pixel of the compressed picture signal; and a predicting section for predicting an original picture signal from the prediction picture formed by the forming section and a predetermined prediction coefficient and outputting the original picture signal.

A picture decoding method for decoding a compressed picture signal to an original picture signal according to the present invention includes: a receiving step of receiving the compressed picture signal; a formation step of forming a prediction picture of a pattern corresponding to a pattern code appended to a pixel value of a notable pixel of the compressed picture signal; and a prediction step of predicting an original picture signal from the prediction picture formed by the formation step and a predetermined prediction coefficient and outputting the original picture signal.

A recording medium according to the present invention has a compressed picture signal recorded thereon, the compressed picture signal being decodable by a picture decoding device. This compressed picture signal is formed by a compression step of generating a compressed picture signal having a number of pixels smaller than the number of pixels of an original picture signal, a formation step of forming plural patterns of prediction pixels by using neighboring pixels of a notable pixel which is one of pixels constituting the compressed picture signal, a prediction step of predicting the original picture signal from each of the plural patterns of prediction pixels and a predetermined prediction coefficient and outputting each of prediction values with respect to the plural patterns of prediction pixels, a calculation step of calculating a prediction error of each of the prediction values of the plural patterns of prediction pixels with respect to the original picture signal, and an appending step of appending a pattern code corresponding to a prediction pixel with which a minimum prediction error is obtained, among the plural patterns of prediction pixels, to the pixel value of the notable pixel.

BEST MODE FOR CARRYING OUT THE INVENTION

Preferred embodiments of a picture encoding device, a picture encoding method, a picture decoding device, a picture decoding method and a recording medium will now be described in detail with reference to the drawings.

Figure 1:
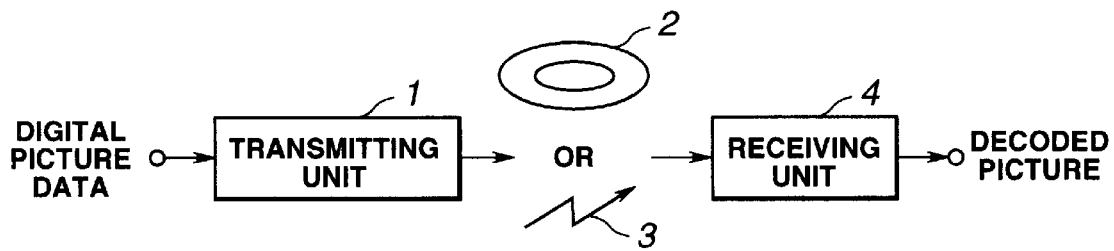
FIG. 1 is a block diagram showing the structure of an embodiment of a picture processing device according to the present invention.

FIG. 1 shows the structure of an embodiment of a picture processing device according to the present invention. A transmitting unit 1 is supplied with picture data of a digitized HD picture. The transmitting unit 1 compresses and codes the input picture data by thinning (i.e., reducing the number of pixels of) the input picture data. The transmitting unit 1 records picture data of an SD picture thus obtained, as coded data of the HD picture, onto a recording medium 2 such as an optical disc, a magneto-optical disc, a magnetic tape or the like, or transmits the picture data by ground waves or through a transmission line 3 such as a satellite circuit, a telephone line, a CATV network or the like.

A receiving unit 4 reproduces the coded data recorded on the recording medium 2, or receives the coded data transmitted through the transmission line 3. The receiving unit 4 expands and decodes the coded data, and supplies a decoded picture of the HD picture thus obtained to a display, not shown, so as to display the decoded picture.

The picture processing device as described above is applied to a picture recording/reproducing device such as an optical disc device, a magneto-optical disc device, a magnetic tape device or the like, or a device for transmitting pictures such as a video telephone device, a television broadcasting system, a CATV system or the like. Since the transmitting unit 1 outputs the coded data of a small data quantity, as later described, the picture processing device of FIG. 1 is also applicable to a portable terminal having a low transmission rate, for example, a portable telephone unit or the like.

Figure 2:
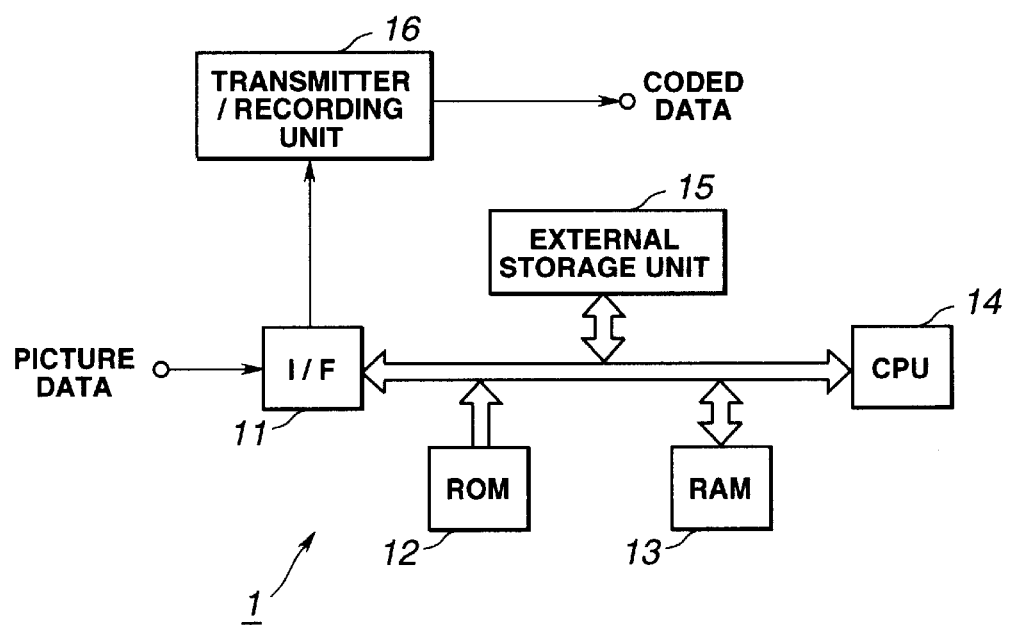
FIG. 2 is a block diagram showing an example of the structure of a transmitting unit 1 of FIG. 1.

FIG. 2 shows an example of the structure of the transmitting unit 1.

An I/F (Interface) 11 is adapted for receiving picture data of an HD picture supplied from outside and for transmitting coded data to a transmitter/recording unit 16. A ROM (Read Only Memory) 12 stores an IPL (Initial Program Loading) program and the like. A RAM (Random Access Memory) 13 is adapted for storing a system program (Operating System or OS) and application program recorded in an external storage unit 15 and for storing data necessary for operation of a CPU (Central Processing Unit) 14. The CPU 14 expands the system program and the application program from the external storage unit 15 to the RAM 13 and executes the application program under the control of the system program, thereby carrying out coding processing as later described with respect to the picture data supplied from the I/F 11. The external storage unit 15 is constituted by, for example, a magnetic disk unit, and stores the data necessary for operation of the CPU 14 as well as the system program and application program, as described above. The transmitter/recording unit 16 records the coded data supplied from the I/F 11 onto the recording medium 2, or transmits the coded data through the transmission line 3.

The I/F 11, the ROM 12, the RAM 13, the CPU 14 and the external storage unit 15 are interconnected through a bus. Although the transmitting unit 1 in FIG. 2 uses the CPU 14, it may also be constituted by a hard-wired logic circuit.

In the transmitting unit 1 thus constituted, when picture data of an HD picture is supplied to the I/F 11, the picture data is supplied to the CPU 14. The CPU 14 codes the picture data and supplies an SD picture as coded data thus obtained to the I/F 11. On receiving the coded data, the I/F 11 supplies the coded data to the transmitter/recording unit 16. The transmitter/recording unit 16 records the coded data from the I/F 11 onto the recording medium 2, or transmits the coded data through the transmission line 3.

Figure 3:
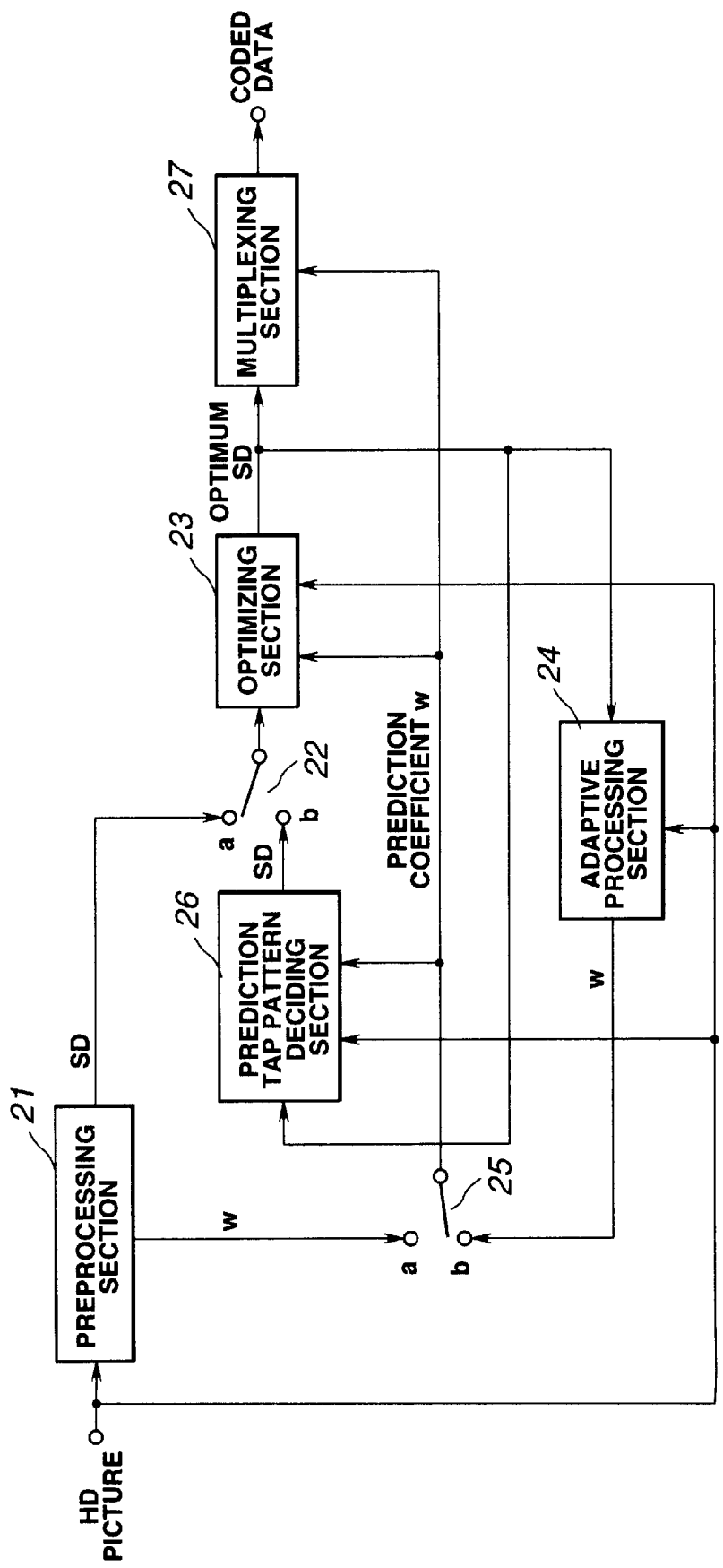
FIG. 3 is a block diagram showing an example of the functional structure of the transmitting unit 1 of FIG. 2.

FIG. 3 is a functional block diagram showing portions of the transmitting unit 1 of FIG. 2, except for the transmitter/recording unit 16.

The HD picture as picture data to be coded is supplied to the preprocessing section 21, the optimizing section 23, the adaptive processing section 24, and the prediction tap deciding section 26.

The preprocessing section 21 carries out preprocessing as later described on the single-frame basis (or single-field basis) with respect to the HD picture supplied thereto, and supplies a set of prediction coefficients w for every class with respect to each of SD pictures thus obtained or plural patterns of prediction taps, to a terminal a of a switch 24 or 25. The terminal a or b of the switch 22 is supplied with the SD picture outputted from the preprocessing section 21 or the prediction tap pattern deciding section 26. The switch 22 selects the terminal a only when a certain HD picture is preprocessed by the preprocessing section 21 so as to output an SD picture. In other cases, the switch 22 selects the terminal b. The switch 22 thus supplies the SD picture outputted from the preprocessing section 21 or the prediction tap deciding section 26 to the optimizing section 23.

The optimizing section 23 carries out optimization as explained above with reference to FIG. 25, on the SD picture supplied from the switch 22, and supplies the optimum SD picture thus obtained to the adaptive processing section 24, the prediction tap pattern deciding section 26 and a multiplexing section 27. The adaptive processing 24 carries out adaptive processing using the optimum SD picture from the optimizing section 23 and the original HD picture, thereby calculating a set of prediction coefficients w for every class which reduces a prediction error of the prediction value of the HD picture found by linear combination with the pixel value of the optimum SD picture. The adaptive processing section 24 thus outputs the calculated set of prediction coefficients w to the terminal b of the switch 25.

The switch 25 selects the terminal a only when preprocessing is carried out on a certain HD picture by the preprocessing section 21 so as to output a set of prediction coefficients w for every class with respect to each of plural patterns of prediction taps. In other cases, the switch 25 selects the terminal b. The switch 25 thus supplies the set of prediction coefficients w for every class with respect to each of the plural patterns of prediction taps outputted from the preprocessing section 21 or the adaptive processing section 24, to the optimizing section 23, the prediction tap pattern deciding section 26, and the multiplexing section 27.

The prediction tap pattern deciding section 26 forms plural patterns of prediction taps from the optimum SD picture supplied from the optimizing section 23, and carries out adaptive processing using each of the plural patterns of prediction taps, thereby finding prediction values of plural HD pictures. In addition, the prediction tap pattern deciding section 26 decides a prediction tap pattern which minimizes the prediction error of the prediction values of the plural HD pictures, from among the plural patterns of prediction taps. The prediction tap pattern deciding section 26 appends a pattern code as later described to the pixel value of the optimum SD picture from the optimizing section 23 in response to the result of decision, and supplies the pixel value of the optimum SD picture with the pattern code appended thereto to the terminal b of the switch 22.

The multiplexing section 27, in a predetermined case, multiplies the optimum SD picture supplied from the optimizing section 23 and the set of prediction coefficients w for every class with respect to each of the plural patterns of prediction taps supplied through the switch 25, and outputs the multiplexing result as coded data to the transmitter/recording unit 16 (FIG. 2).

Figure 4:
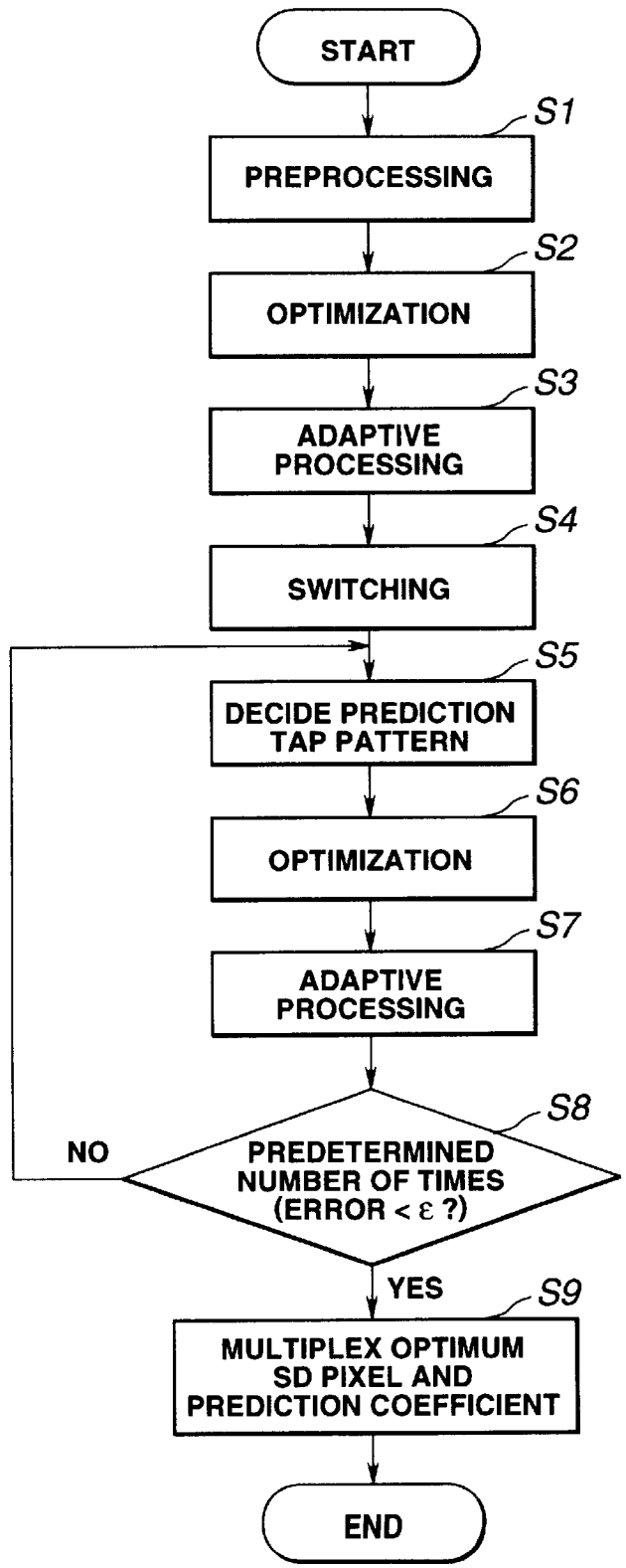
FIG. 4 is a flowchart for explaining the operation of the transmitting unit 1 of FIG. 3.

Referring to the flowchart of FIG. 4, the operation of the transmitting unit 1 will now be described.

When the HD picture to be coded is supplied to the preprocessing section 21, the optimizing section 23, the adaptive processing section 24 and the prediction tap pattern deciding section 26, the preprocessing section 21 carries out preprocessing on the HD picture, at step S1.

Specifically, the preprocessing section 21 forms an SD picture by reducing the number of pixels of the HD picture and thus compressing the HD picture. The preprocessing section 21 sequentially uses SD pixels constituting the SD picture as notable pixels, and forms plural patterns of prediction taps with respect to each of the notable pixels. In addition, the preprocessing section 21 establishes and solves the normal equation of Equation 13 with respect to each of the plural patterns of prediction taps, thereby finding a set of prediction coefficients w for every class. Then, the preprocessing section 21 calculates the linear primary formula of Equation 1 using the plural patterns of prediction taps and a set of prediction coefficients for a predetermined class, of the set of prediction coefficients w for every class found with respect to each of the plural patterns of prediction taps, thereby finding prediction values of plural HD pictures obtained from the plural patterns of prediction taps. In addition, the preprocessing section 21 detects a prediction tap pattern which minimizes the prediction error of the prediction values of the plural HD pictures, from among the plural patterns of prediction taps, and is caused to correspond the detected prediction tap pattern in advance. For example, the preprocessing section 21 appends a tap pattern code of two-bit code to an SD pixel as a notable pixel and outputs this SD pixel.

Thus, the SD picture to which the tap pattern code is appended is outputted to the terminal a of the switch 22, and the set of prediction coefficients w for every class with respect to each of the plural patterns of prediction taps obtained by solving the normal equation is outputted to the terminal a of the switch 25.

The switches 22 and 25 select the terminals a, respectively, at a timing when the SD picture and the set of prediction coefficients w for every class with respect to each of the plural patterns of prediction taps are outputted from the preprocessing section 21. Therefore, the SD picture outputted by the preprocessing section 21 is supplied to the optimizing section 23 through the switch 22, and the set of prediction coefficients w for every class with respect to each of the plural patterns of prediction taps outputted by the preprocessing section 21 is outputted to the optimizing section 23 and the prediction tap pattern deciding section 26 through the switch 25.

On receiving the SD picture and the set of prediction coefficients w for every class with respect to each of the plural patterns of prediction taps, the optimizing section 23 carries out optimization using these SD picture and set of prediction coefficients w, at step S2. Specifically, the optimizing section 23 carries out adaptive processing using the SD picture and the set of prediction coefficients w for every class with respect to each of the plural patterns of prediction taps, and corrects the pixel value of the SD picture so that the prediction error of the prediction value of an HD picture thus obtained is reduced. The optimizing section 23 supplies an optimum SD picture thus obtained to the adaptive processing section 24 and the prediction tap pattern deciding section 26.

On receiving the optimum SD picture from the optimizing section 23, the adaptive processing section 24 carries out adaptive processing, at step S3, thereby calculating a set of prediction coefficients w for every class with respect to each of the plural patterns of prediction taps which reduces the prediction error of the prediction value of the HD picture obtained from the optimum SD picture. Specifically, the adaptive processing section 24 sequentially uses SD pixels constituting the optimum SD picture as notable pixels, and forms a prediction tap for each of the notable pixels. At this point, the prediction tap is of a pattern corresponding to the tap pattern code appended to the notable pixel. Then, the adaptive processing section 24 establishes a normal equation from the prediction tap for each of the plural patterns of prediction taps and solves this normal equation, thereby finding a set of prediction coefficients w for every class with respect to each of the plural patterns of prediction taps. The set of prediction coefficients w for every class with respect to each of the plural patterns of prediction taps is supplied to the terminal b of the switch 25.

After the above-described processing, the operation proceeds to step S4, where the switches 22 and 25 are changed over from the terminal a to the terminal b. Thus, the set of prediction coefficients w for every class with respect to each of the plural patterns of prediction taps, found by the adaptive processing section 24, is supplied to the optimizing section 23 and the prediction tap pattern deciding section 26 through the switch 25.

On receiving the optimum SD picture from the optimizing section 23 and the set of prediction coefficients w for every class with respect to each of the plural patterns of prediction taps from the adaptive processing section 24, the prediction tap pattern deciding section 26 decides an optimum pattern of prediction tap formed on the basis of each SD pixel constituting the optimum SD picture as a notable pixel, at step S5.

Specifically, the prediction tap pattern deciding section 26 sequentially uses the SD pixels constituting the optimum SD picture as notable pixels, and forms plural patterns of prediction taps with respect to the individual notable pixels. In addition, the prediction tap pattern deciding section 26 calculates the linear primary formula of Equation 1 using a set of prediction coefficients w for a predetermined class, from among the sets of prediction coefficients for the respective classes corresponding to the prediction tap from the adaptive processing section 24, with respect to each of the plural patterns of prediction taps, thereby finding prediction values of plural HD pictures obtained from the plural patterns of prediction taps. Then, the prediction tap pattern deciding section 26 detects a prediction tap which minimizes the prediction error of the prediction values of the plural HD pictures, from among the plural patterns of prediction taps, and changes the tap pattern code already appended to the SD pixel as the notable pixel, to a tap pattern code corresponding to the detected prediction tap. That is, in the current case, since the tap pattern code is already appended to the SD pixel, the tap pattern code of the prediction tap which minimizes the prediction error is appended in place of the former tap pattern code.

Thus, the SD picture having its tap pattern code changed is outputted to the terminal b of the switch 22.

Since the switch 22 is changed over at step S4 to select the terminal b, the SD picture outputted from the prediction tap pattern deciding section 26 is supplied to the optimizing section 23 through the switch 22. The optimizing section 23, at step S6, carries out optimization processing similar to that of step S2, thereby outputting the optimum SD picture. In this case, the optimizing section 23 carries out adaptive processing as described at step S2. This adaptive processing is carried out by using the set of prediction coefficients w for every class with respect to each of the plural patterns of prediction taps supplied from the adaptive processing section 24 through the switch 25.

The optimum SD picture outputted from the optimizing section 23 is supplied to the adaptive processing section 24 and the prediction tap pattern deciding section 26. The adaptive processing section 24, at step S7, carries out adaptive processing using the optimum SD picture outputted from the optimizing section 23, similarly to step S3. The adaptive processing section 24 thus finds the set of prediction coefficients w for every class with respect to each of the plural patterns of prediction taps, and outputs the set of prediction coefficients w to the optimizing section 23 and the prediction tap pattern deciding section 26 through the switch 25.

After that, the operating proceeds to step S8, where it is decided whether or not the processing of steps S5 to S8 has been carried out for a predetermined number of times. If it is decided that the processing of steps S5 to S8 has not been carried out for the predetermined number of time, the operation returns to step S5 and the above-described processing is repeated. If it is decided, at step S8, that the processing of steps S5 to S8 has been carried out for the predetermined number of times, the operation proceeds to step S9. Then, the multiplexing section 27 multiplexes the optimum SD picture outputted by the optimizing section 23 in the previous processing of step S6 and the set of prediction coefficients w for every class with respect to each of the plural patterns of prediction taps used in that processing. The multiplexing section 27 outputs the multiplexing result as coded data, and the operation ends.

The above-described processing is repeated on the single-frame basis, for example.

In the above-described case, it is decided at step S8 whether the processing of steps S5 to S8 has been carried out for the predetermined number of times. However, other processing may be carried out at step S8. For example, it is decided whether or not an absolute value sum for one frame of the prediction error of the prediction value of the HD picture obtained by carrying out adaptive processing using the optimum SD picture outputted from the optimizing section 23 at that time is not greater than a predetermined threshold value. If the absolute value sum is not greater than the threshold value, the operating proceeds to step S9. If the absolute value sum is greater than the threshold value, the operation returns to step S5. That is, the processing of steps S5 to S8 may be repeated until the absolute value sum for one frame of the prediction error of the prediction value of the HD picture obtained by carrying out adaptive processing using the optimum SD picture becomes not greater than the predetermined threshold value.

Figure 5:
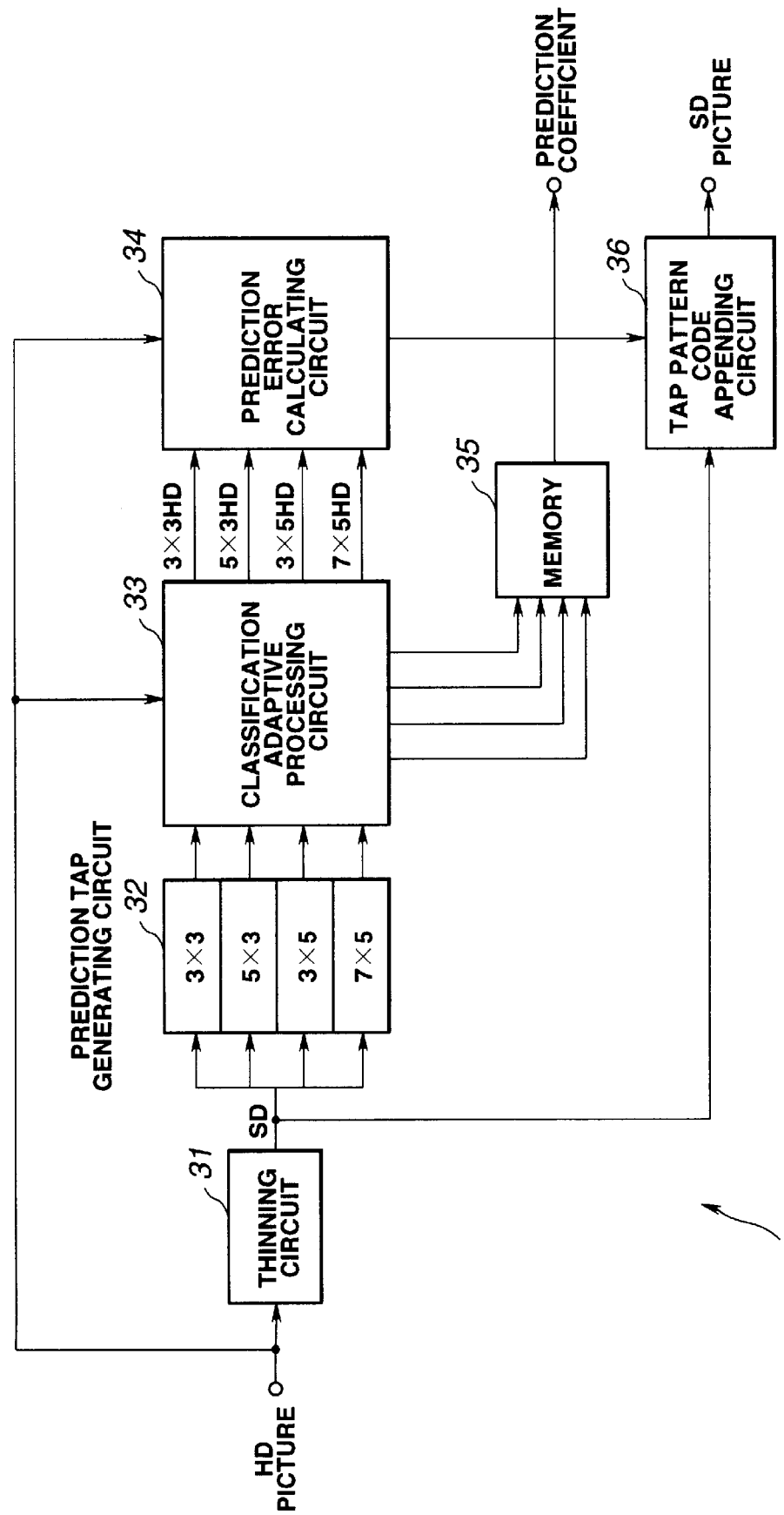
FIG. 5 is a block diagram showing an example of the structure of a preprocessing section 21 of FIG. 3.

FIG. 5 shows an example of the structure of the preprocessing section 21 of FIG. 3.

The HD picture to be coded is supplied to a thinning circuit 31, a classification adaptive processing (prediction coefficient and prediction value calculation) circuit 33, and a prediction error calculating circuit 34.

The thinning circuit 31 reduces the number of pixels of the HD picture by thinning so as to form an SD picture, and supplies the SD picture to a prediction tap generating circuit 32 and a tap pattern code appending circuit 36. Specifically, the thinning circuit 31 divides the HD picture into square blocks consisting of three horizontal pixels x three vertical pixels, that is, nine pixels, and uses the average value of the nine pixels of the individual blocks as the pixel value of the center pixel, thereby forming the SD picture. Thus, the thinning circuit 31 forms the SD picture consisting of SD pixels indicated by ○ in FIG. 6 from the HD picture consisting of HD pixels indicated by ● in FIG. 6.

The thinning circuit 31 may also extract only the center pixel of the above-described blocks so as to form the SD picture.

The prediction tap generating circuit 32 sequentially uses the SD pixels (indicated by ○ in FIG. 6) constituting the SD picture from the thinning circuit 31, as notable pixels, and forms plural patterns of prediction taps with respect to the individual notable pixels. In this embodiment, for example, four patterns of prediction taps of 3×3 pixels, 5×3 pixels, 3×5 pixels and 7×5 pixels having the notable pixel as the center are formed, as shown in FIGS. 7 to 10. These four patterns of prediction taps are supplied to the classification adaptive processing (prediction coefficient and prediction value calculation) circuit 33.

The classification adaptive processing (prediction coefficient and prediction value calculation) circuit 33 classifies each of the four patterns of prediction taps supplied from the prediction tap generating circuit 32, and establishes and solves the normal equation of Equation 13 using the HD picture with respect to each class, thereby finding a set of prediction coefficients w for every class with respect to each of the four patterns of prediction taps. Also, the classification adaptive processing (prediction coefficient and prediction value calculation) circuit 33 calculates the linear primary formula of Equation 1, from each of the prediction coefficients w of a predetermined class from among the set of the prediction coefficients w for every class with respect to each of the four patterns of prediction taps, and from each of the four patterns of prediction taps. The classification adaptive processing (prediction coefficient and prediction value calculation) circuit 33 thus finds prediction values of plural HD pictures obtained from the four patterns of prediction taps, respectively, and outputs the prediction values to the prediction error calculating circuit 34.

The classification adaptive processing (prediction coefficient and prediction value calculation) circuit 33 supplies, to a memory 35, the set of prediction coefficients w for every class found with respect to each of the four patterns of prediction taps.

Figure 6:
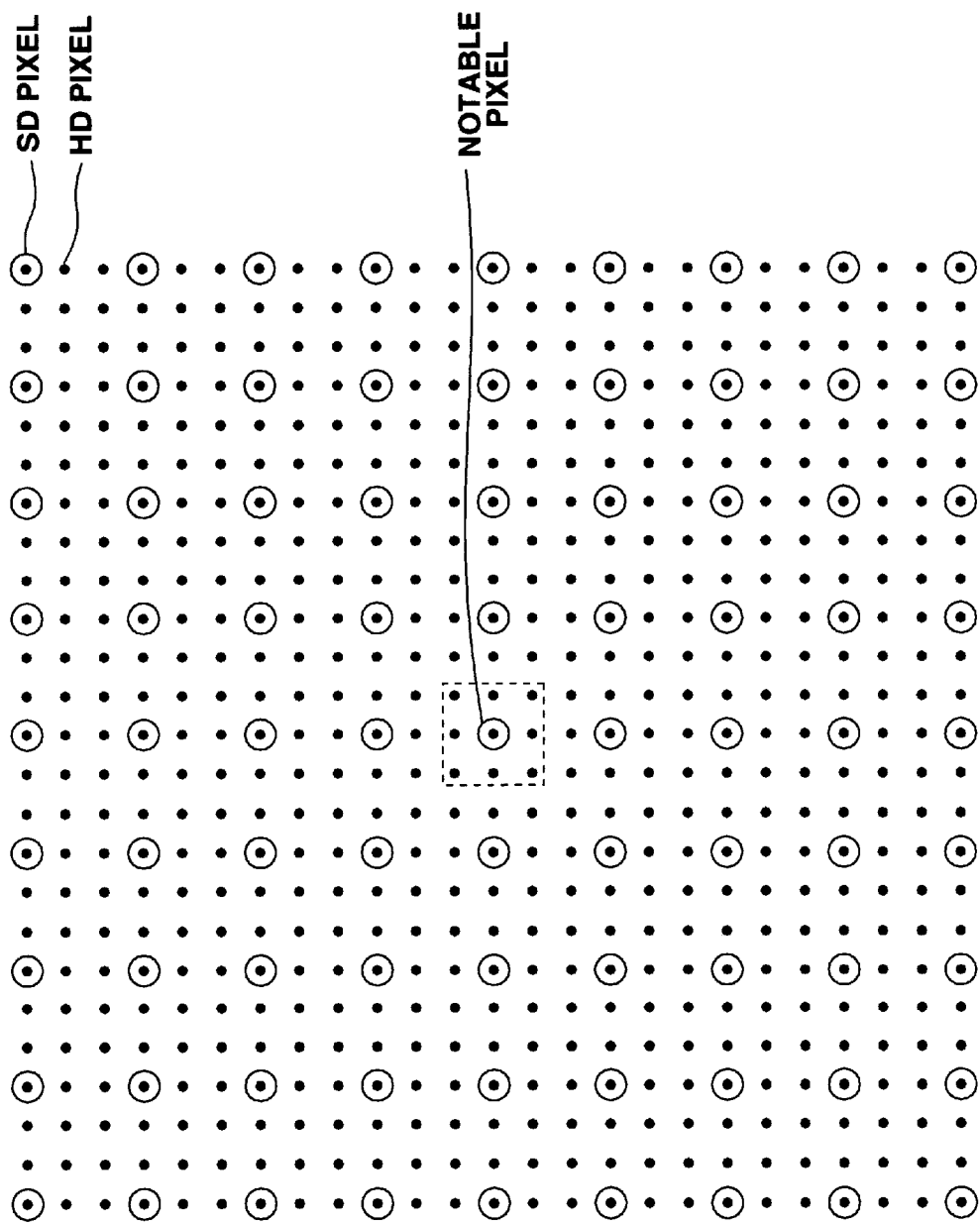
FIG. 6 is a view for explaining the processing of a thinning circuit 31 of FIG. 5.
Figure 7:
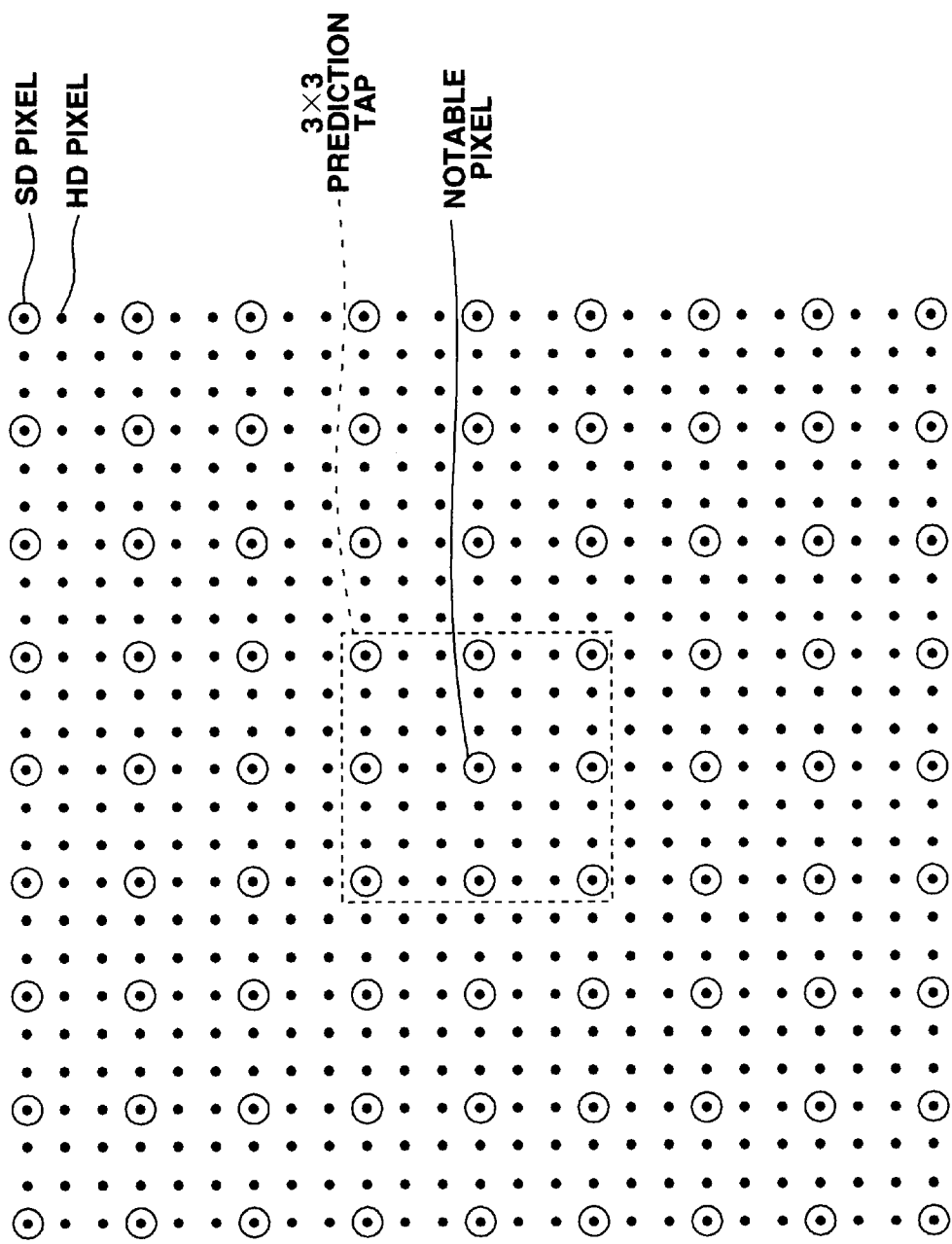
FIG. 7 is a view showing an example of the structure of a prediction tap.
Figure 8:
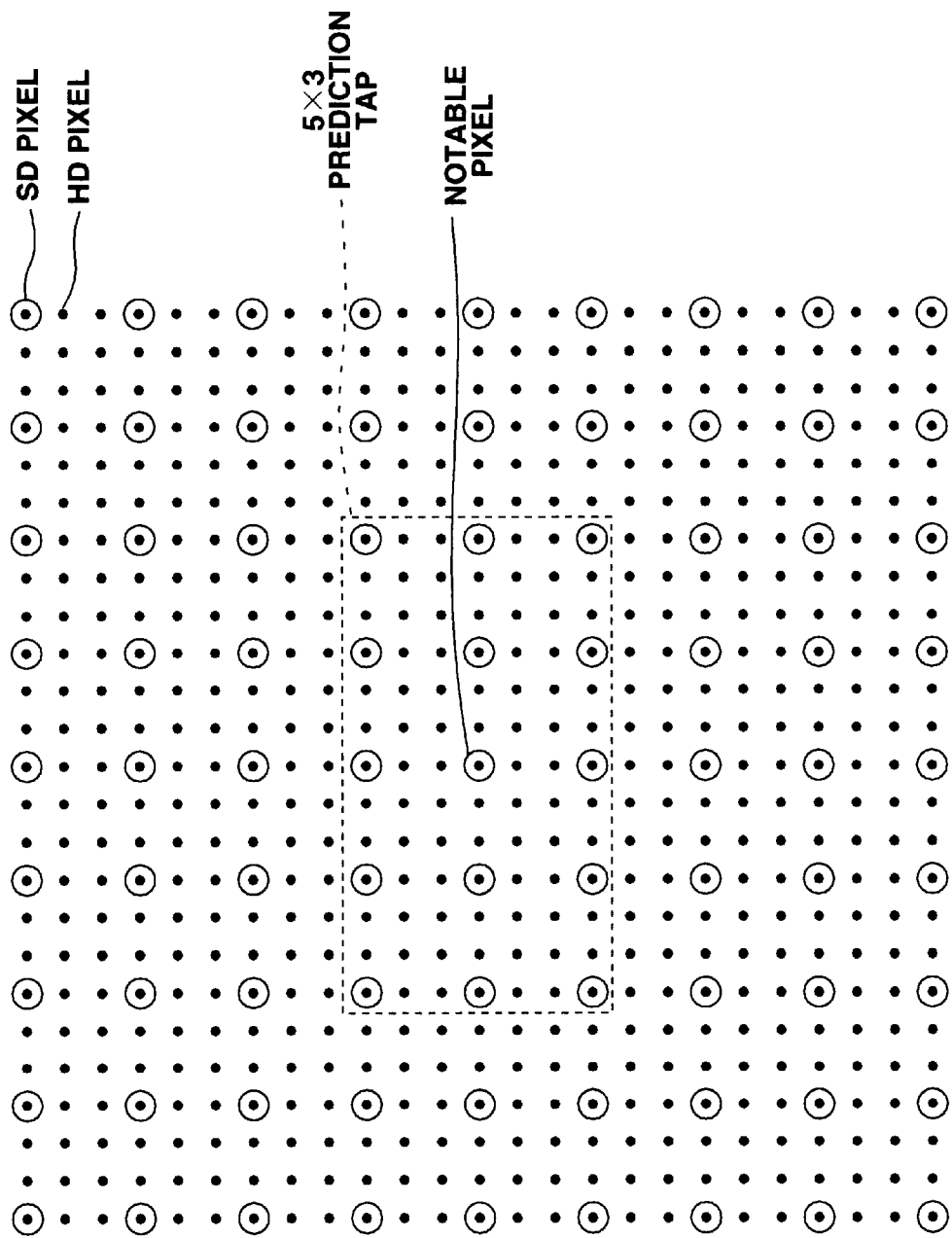
FIG. 8 is a view showing another example of the structure of the prediction tap.
Figure 9:
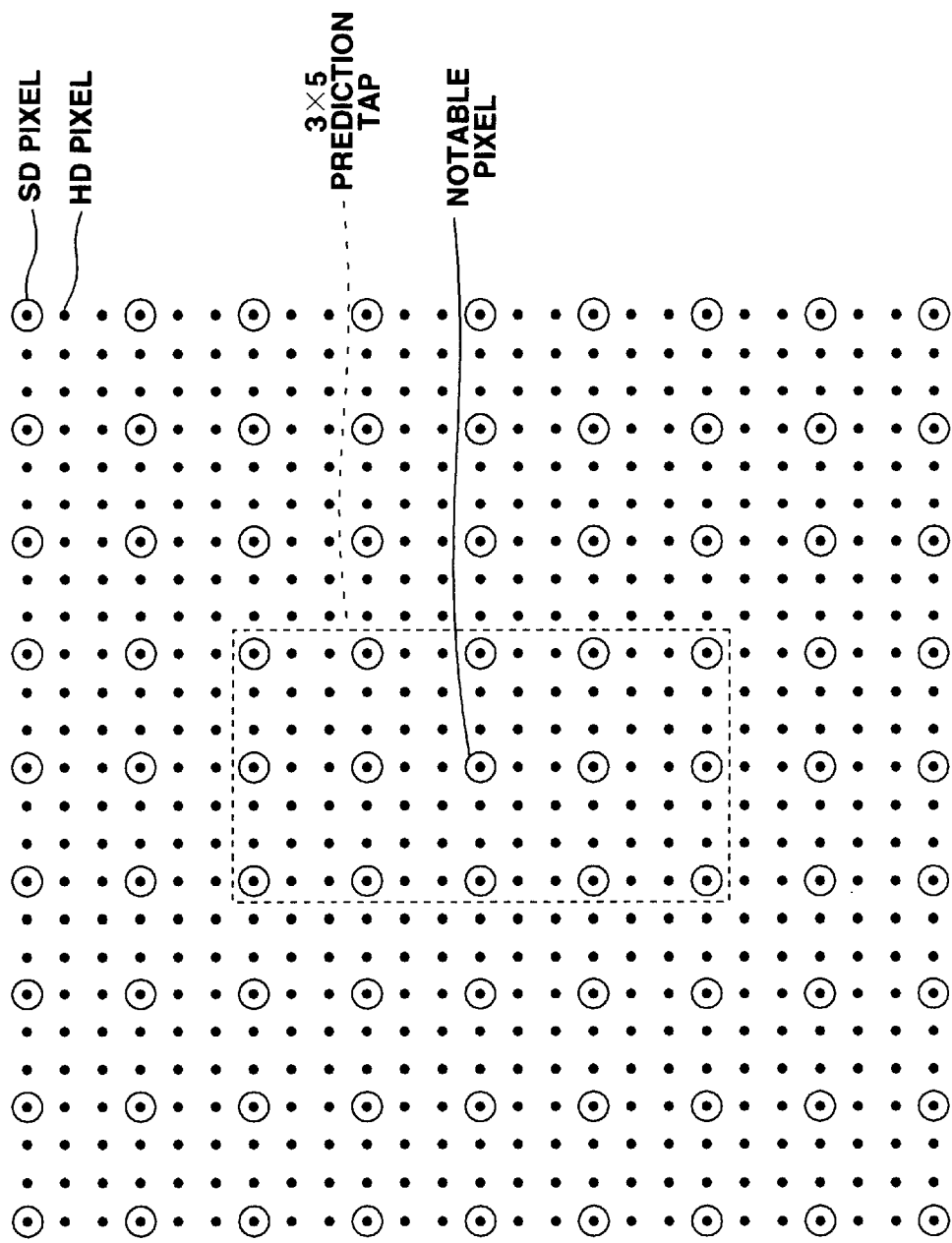
FIG. 9 is a view showing still another example of the structure of the prediction tap.

In addition, in this embodiment, the classification adaptive processing (prediction coefficient and prediction value calculation) circuit 33 establishes the normal equation so as to find the prediction value of the HD picture of 3×3 pixels centering the SD pixel as the notable pixel as indicated by a dotted line in FIG. 6, regardless of the prediction tap pattern, with respect to each of the four patterns of prediction taps. Therefore, the set of prediction coefficients w for every class with respect to each of the four patterns of prediction taps for generating the prediction value of 3×3 HD pixels is found. The structure of the classification adaptive processing (prediction coefficient and prediction value calculation) circuit 33 will be later described in detail.

The prediction error calculating circuit 34 finds the prediction error of the prediction value of each notable pixel of the HD picture obtained from each of the four patterns of prediction taps, with respect to the pixel value of the original HD picture. In short, the prediction error calculating circuit 34 calculates the square sum of the difference between prediction values of the nine pixels of the HD picture and pixel values of the nine pixels of the original HD picture, with respect to the four patterns of prediction taps. Then, the prediction error calculating circuit 34 detects a prediction tap pattern which has the minimum prediction error (square sum of the difference), from among the four patterns of prediction taps. The prediction error calculating circuit 34 outputs a tap pattern code of two bits corresponding to the prediction tap pattern having the minimum prediction error, to the memory 35 and the tap pattern code appending circuit 36.

The memory 35 temporarily stores the set of prediction coefficients w for every class with respect to each of the four patterns of prediction taps, supplied from the classification adaptive processing (prediction coefficient and prediction value calculation) circuit 33. On completion of the processing of one frame (or one field) of the HD picture (i.e., on completion of appendage of the tap pattern code to all the SD pixels), the memory 35 reads out the set of prediction coefficients w for every class found with respect to each of the four patterns of prediction taps, and outputs the set of prediction coefficients w to the terminal a of the switch 25.

The tap pattern code appending circuit 36 appends the tap pattern code supplied from the prediction error calculating circuit 34, to the SD picture supplied thereto. Specifically, the tap pattern code appending circuit 36 erases two bits on the LSB (Least Significant Bit) side of the pixel value (constituted by eight bits, for example) of the SD pixel as the notable pixel, and locates the tap pattern code of two bits in the corresponding position. The SD picture to which the tap pattern code is appended by the tap pattern code appending circuit 22 is outputted to the terminal a of the switch 22.

Figure 26:
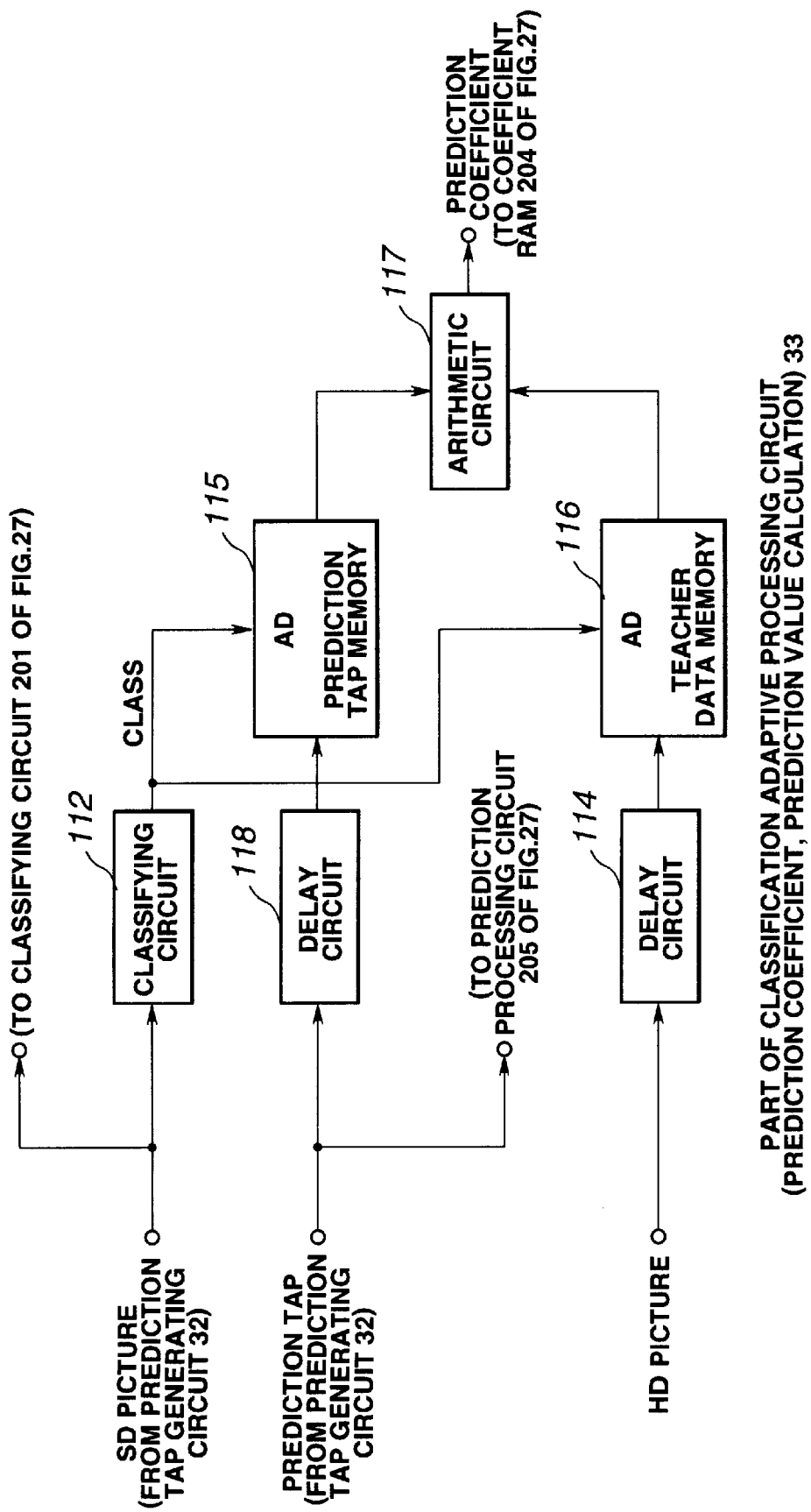
FIG. 26 is a block diagram showing an example of the structure of a part of a classification adaptive processing (prediction coefficient and prediction value calculation) circuit 33.
Figure 27:
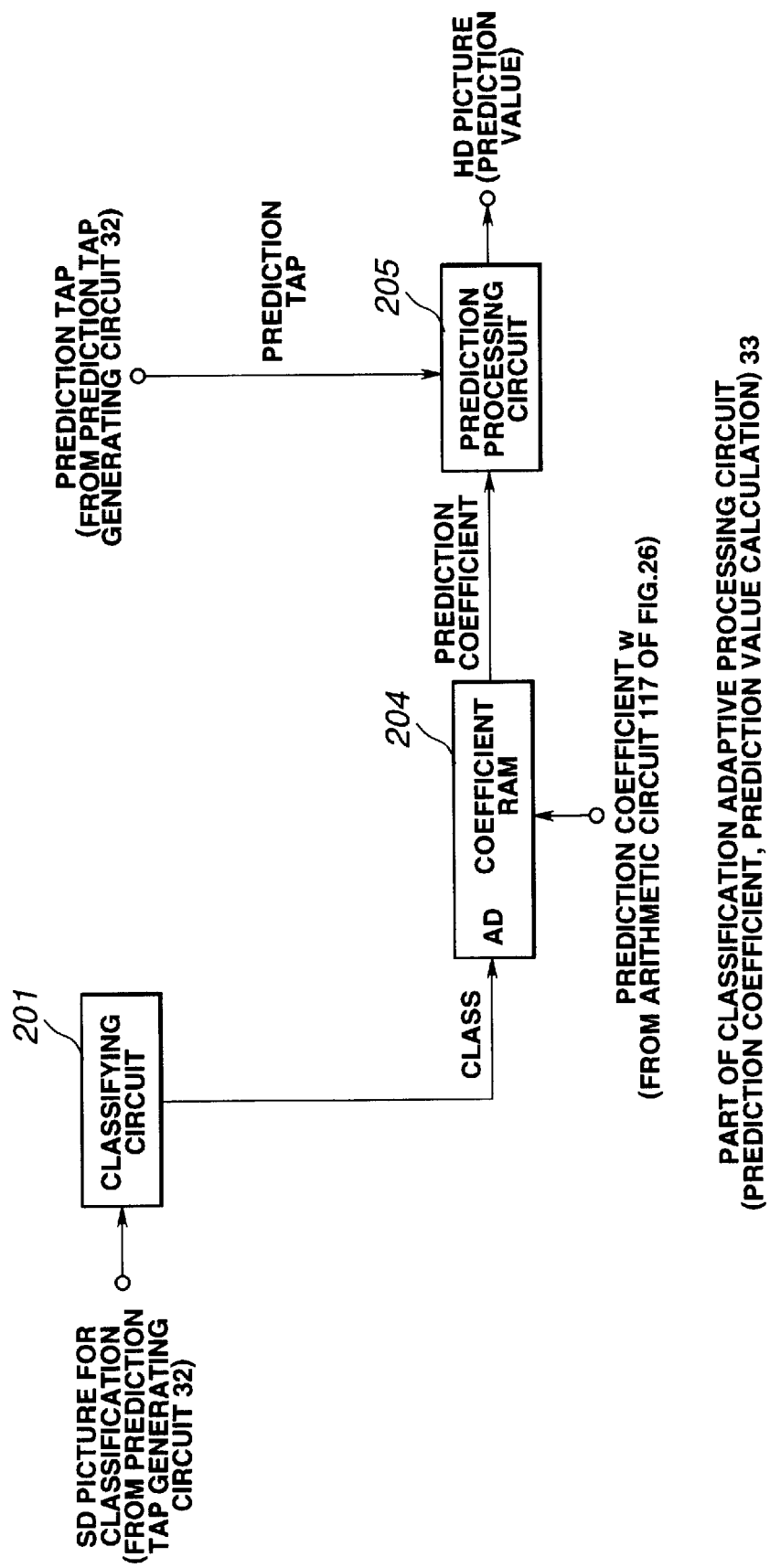
FIG. 27 is a block diagram showing an example of the structure of another part of the classification adaptive processing (prediction coefficient and prediction value calculation) circuit 33.

The structure of the classification adaptive processing (prediction coefficient and prediction value calculation) circuit 33 will now be described. This classification adaptive processing (prediction coefficient and prediction value calculation) circuit 33 has classification adaptive processing (prediction coefficient and prediction value calculation) circuits for the four patterns of prediction taps, respectively. That is, the classification adaptive processing (prediction coefficient and prediction value calculation) circuit 33 has four independent classification adaptive processing circuits for the four patterns of prediction taps. FIGS. 26 and 27 show one of these classification adaptive processing circuits. Since the four classification adaptive processing circuits have the same structure except for that four different prediction taps are supplied, one of the classification adaptive processing circuits will be explained while the other classification adaptive processing circuits will not be described further in detail.

Figure 25:
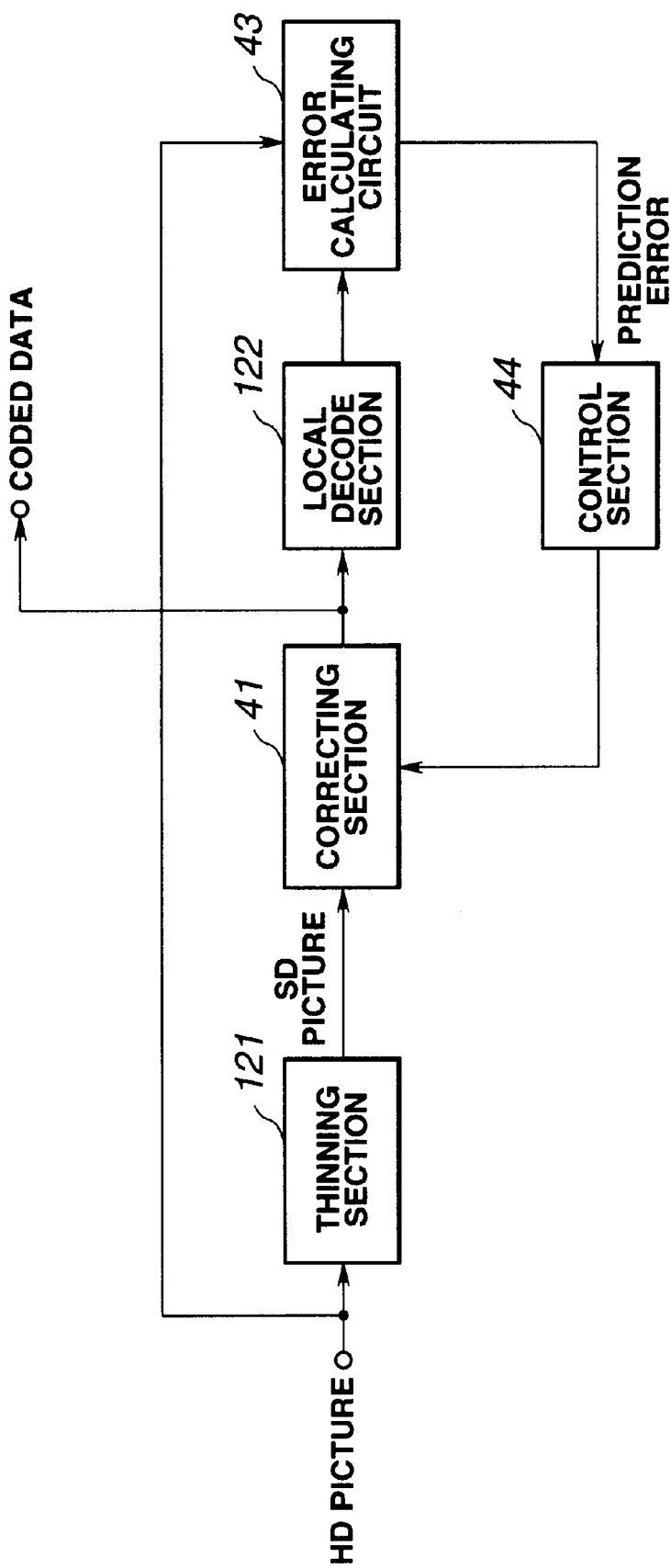
FIG. 25 is a block diagram showing an example of the structure of a picture encoding device previously proposed by the present Assignee.

The classification adaptive processing circuit shown in FIG. 26 includes a classifying circuit 112, a delay circuit 114, a prediction tap memory 115, a teacher data memory 116, an arithmetic circuit 117, and a delay circuit 118 (FIG. 25). The classification adaptive processing circuit shown in FIG. 27 includes a classifying circuit 201, a coefficient RAM 204, and a prediction processing circuit 205.

Figure 22:
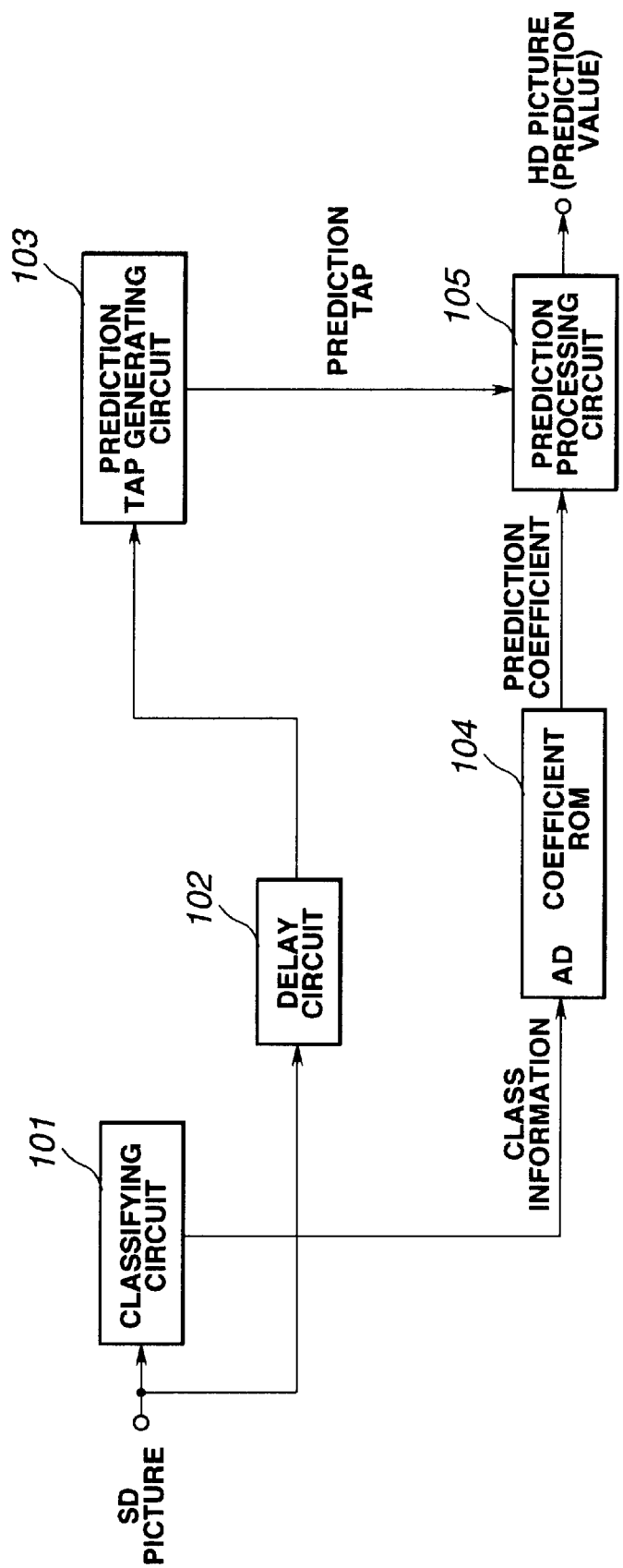
FIG. 22 is a block diagram showing an example of the structure of a picture converting device previously proposed by the present Assignee.
Figure 23:
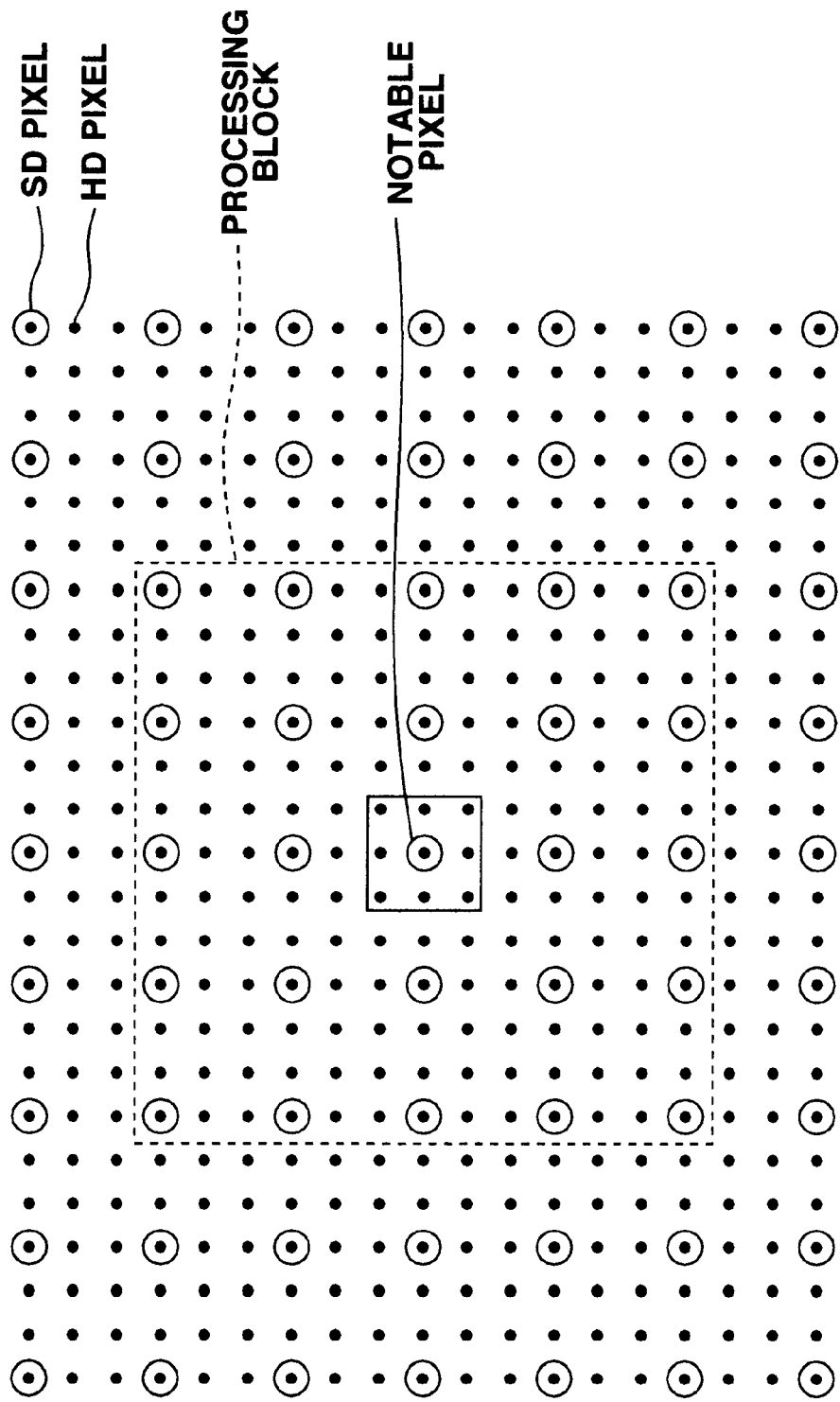
FIG. 23 is a view for explaining the processing of a classifying circuit 101 of FIG. 22.
Figure 24:
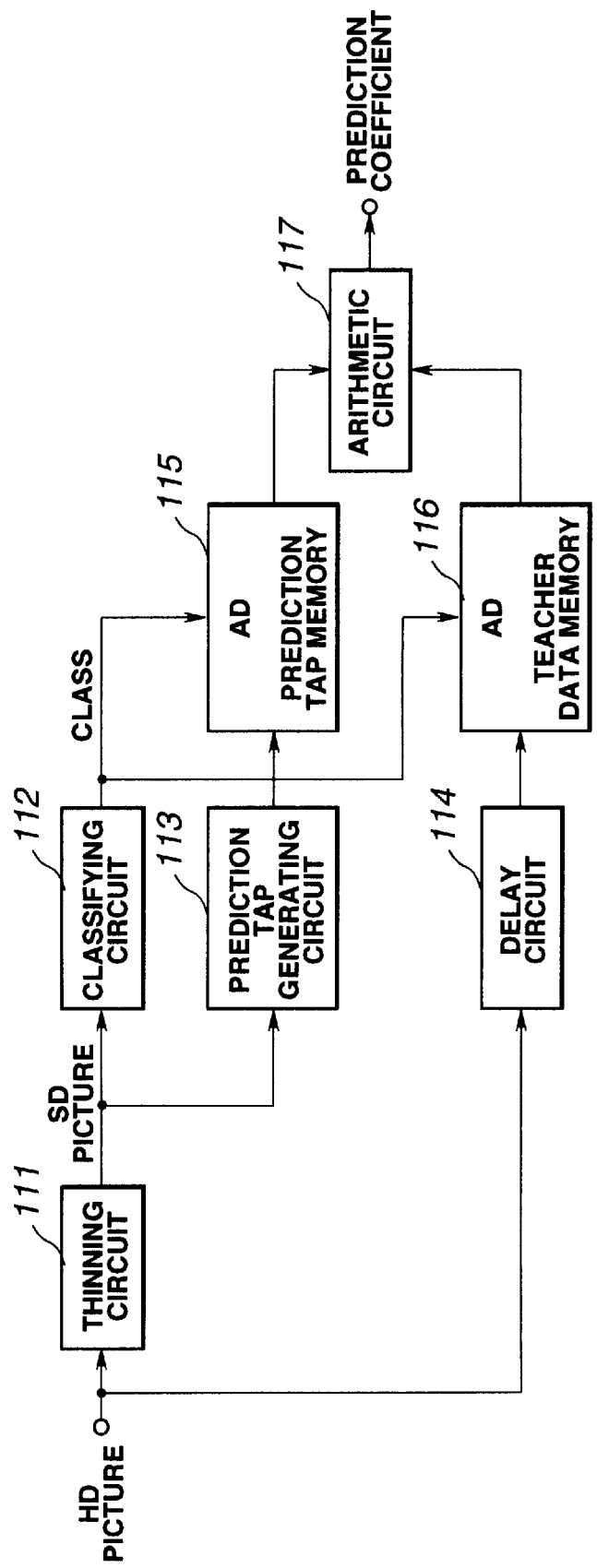
FIG. 24 is a block diagram showing an example of the structure of a learning device previously proposed by the present Assignee.

The individual circuits constituting parts of the classification adaptive processing circuit shown in FIG. 26 are constituted similarly to the classifying circuit 112, the delay circuit 114, the prediction tap memory 115, the teacher data memory 116, the arithmetic circuit 117 and the delay circuit 118 of the learning device of FIG. 24, and similarly to the circuits of the picture converting device of FIG. 22. However, since the prediction tap is supplied from the prediction tap generating circuit 32, the prediction tap is supplied to the delay circuit 118, instead of the prediction tap generating circuit 113 shown in FIG. 24. The delay circuit 118, similar to the delay circuit 114, delays the prediction tap only by the time during which the class for the notable pixel is supplied to the prediction tap memory from the classifying circuit 112. The delay circuit 118 then stores the prediction tap onto the prediction tap memory 115.

After the data of HD pixels of one frame is stored on the prediction tap memory 115 and the teacher data memory 116, a set of prediction coefficients for every class is generated by the operation similar to the operation of the learning device of FIG. 24. The generated set of prediction coefficients for every class is stored onto the coefficient RAM 204 of FIG. 27, and is also supplied to and stored on the memory 35 of the preprocessing section 21 of FIG. 5. As described above, since the sets of prediction coefficients for every class with respect to the four individual patterns of prediction taps are generated by the independent circuit, respectively, the set of prediction coefficients for every class with respect to each of the four patterns of prediction taps is stored onto the coefficient RAM 204 of FIG. 27, and is also supplied to and stored on the memory 35 of the preprocessing section 21 of FIG. 21.

After the set of prediction coefficients for every class with respect to each of the four patterns of prediction taps is stored on the coefficient RAM 204 of FIG. 27, the classifying circuit 201 carries out classification and supplies the class information to the coefficient RAM 204. The coefficient RAM 204 outputs a set of prediction coefficients corresponding to the class information supplied thereto, and supplies this set of prediction coefficients to the prediction processing circuit 205. The prediction processing circuit 205 calculates the linear primary formula of Equation 1 from the prediction tap and the set of prediction coefficients supplied thereto, thereby finding prediction values of plural HD pictures. After the set of prediction coefficients for every class is stored on the coefficient RAM 204, the individual circuits constituting parts of the classification adaptive processing circuit of FIG. 27 execute the same operations as the classifying circuit 101, the coefficient ROM 104 and the prediction processing circuit 105 of the picture converting device of FIG. 22.

Since the classifying circuit 112 and the classifying circuit 201 have the same structure, these circuits may be included in a single structure.

Referring to the flowchart of FIG. 11, the processing of the preprocessing section 21 will now be described.

When the HD picture to be coded is inputted to the preprocessing section 21, the HD picture is supplied to the thinning circuit 31, the classification adaptive processing (prediction coefficient and prediction value calculation) circuit 33, and the prediction error calculating circuit 34. On receiving the HD picture, the thinning circuit 31 thins the number of pixels of the HD picture to form an SD picture, at step S11.

Figure 12:
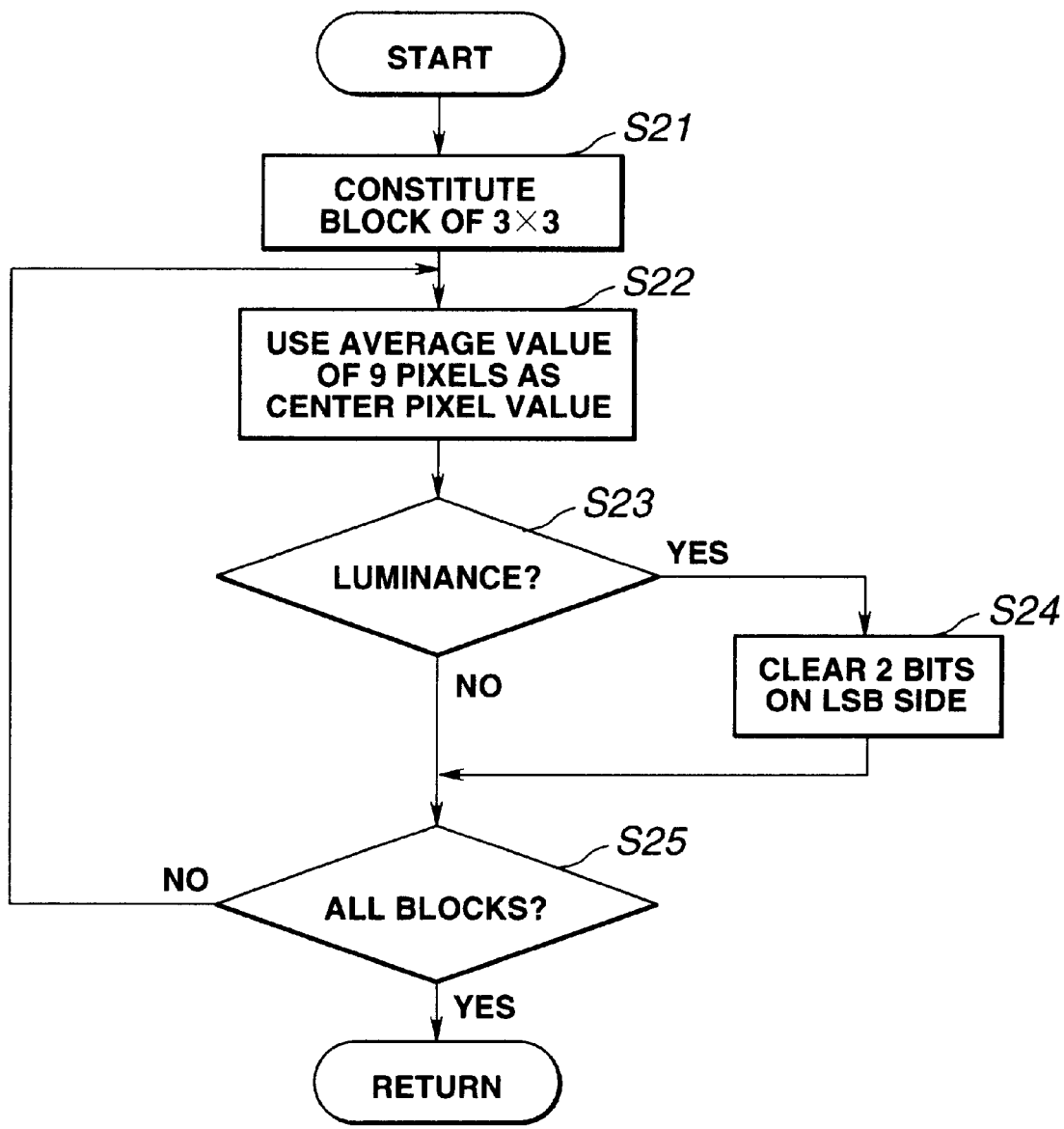
FIG. 12 is a flowchart for explaining the processing of step S11 of FIG. 11 further in detail.

Specifically, in the processing of step S11, the HD picture is first divided into blocks of the HD picture consisting of 3×3 pixels at step S21, and the operation proceeds to step S22, as shown in the flowchart of FIG. 12.

In this embodiment, the HD picture includes a luminance signal Y and color-difference signals U, V. At step S21, blocks of the luminance signal and blocks of the color-difference signals are formed.

At step S22, one of the blocks is used as a notable block, and the average value of pixel values of the 3×3 pixels constituting the notable block is calculated. In addition, at step S22, the average value is used as the pixel value of the center pixel (SD pixel) of the notable block, and the operation proceeds to step S23.

At step S23, it is decided whether or not the notable block is a block of the luminance signal. If it is decided at step S23 that the notable block is a block of the luminance signal, the operation proceeds to step S24, where two bits on the LSB side of the pixel value (in this case, the luminance signal) of the notable block as the SD pixel are cleared to zero for appending a tap pattern code. Then, the operation proceeds to step S25. On the other hand, if it is decided at step S23 that the notable block is not a block of the luminance signal, that is, if the notable block is a block of the color-difference signal, the operation skips step S24 and proceeds to step S25.

In this embodiment, plural patterns of prediction taps are prepared only for the luminance signal, while a fixed pattern of prediction tap is used for the color-difference signal. Therefore, since the tap pattern code is appended only to the luminance signal and is not appended to the color-difference signal, the processing for clearing two bits on the LSB side is not carried out.

At step S25, it is decided whether or not all the blocks formed at step S21 have been processed as notable blocks. If it is decided that all the blocks have not been processed as notable blocks, the operation returns to step S22, where similar processing is repeated by newly using blocks, not used as notable blocks, as notable blocks. If it is decided at step S25 that all the blocks have been processed as notable blocks, that is, if the SD picture is constituted, the operation returns.

Referring to FIG. 11 again, the SD picture thus constituted is supplied from the thinning circuit 31 to the prediction tap generating circuit 32 and the tap pattern code appending circuit 36, at step 511. On receiving the SD picture from the thinning circuit 31, the prediction tap generating circuit 32 uses one of the SD pixels constituting the SD picture as a notable pixel, then forms (generates) the four patterns of prediction taps shown in FIGS. 7 to 10 with respect to the notable pixels, and supplies the four patterns of prediction taps to the classification adaptive processing (prediction coefficient and prediction value calculation) circuit 33, at step S12.

Figure 10:
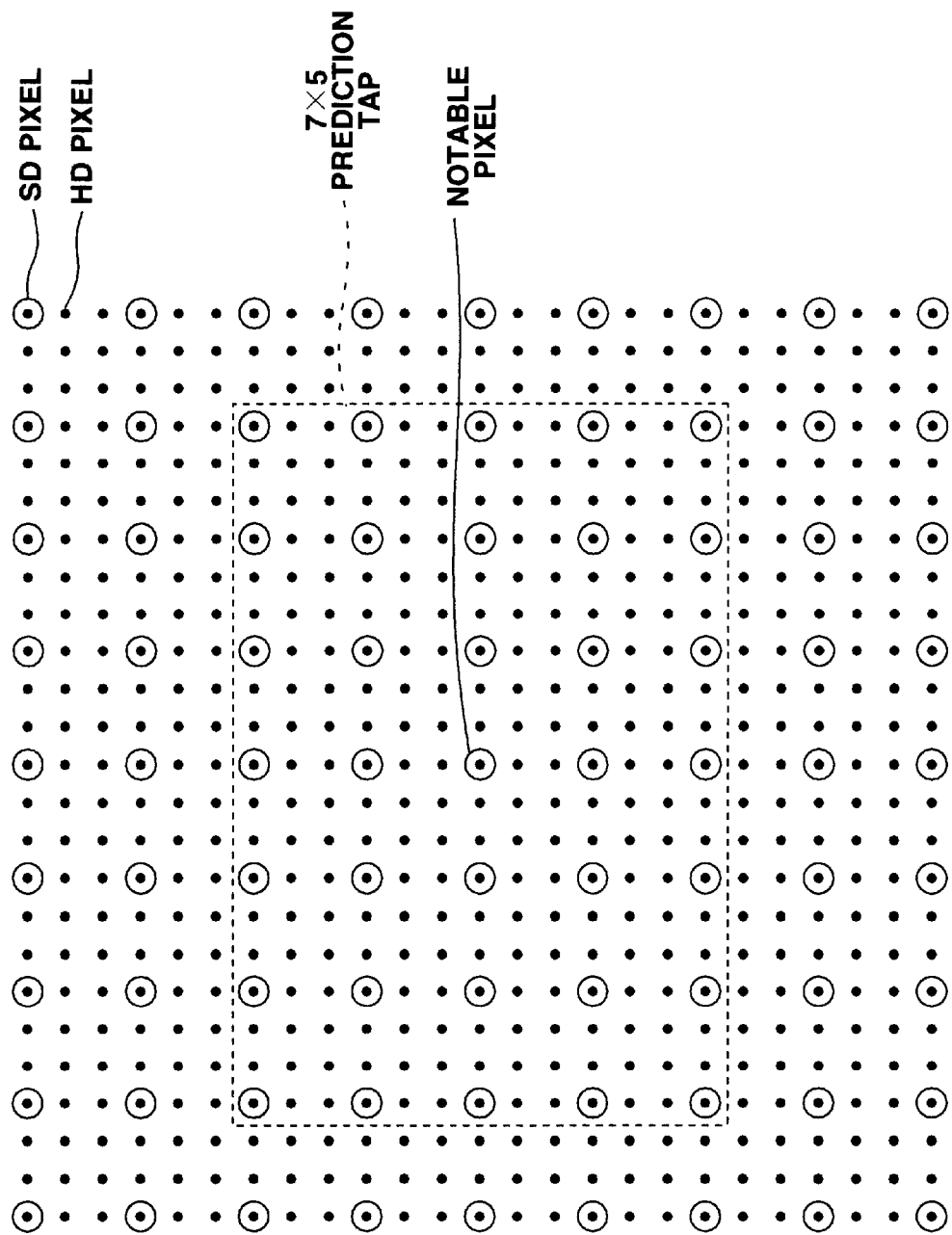
FIG. 10 is a view showing a further example of the structure of the prediction tap.

As described above, the four patterns of prediction taps are formed only for the luminance signal, while a prediction tap of 7×5 pixels as shown in FIG. 10, for example, is constantly formed for the color-difference signal.

The classification adaptive processing (prediction coefficient and prediction value calculation) circuit 33 first classifies the four patterns of prediction taps (in the case of the luminance signal) supplied from the prediction tap generating circuit 32, by using the respective classification adaptive processing circuits, at step S13.

In this embodiment, a classification tap as follows (hereinafter referred to as a class tap) is constituted for each of the four patterns of prediction taps, thus carrying out classification.

Figure 13A:
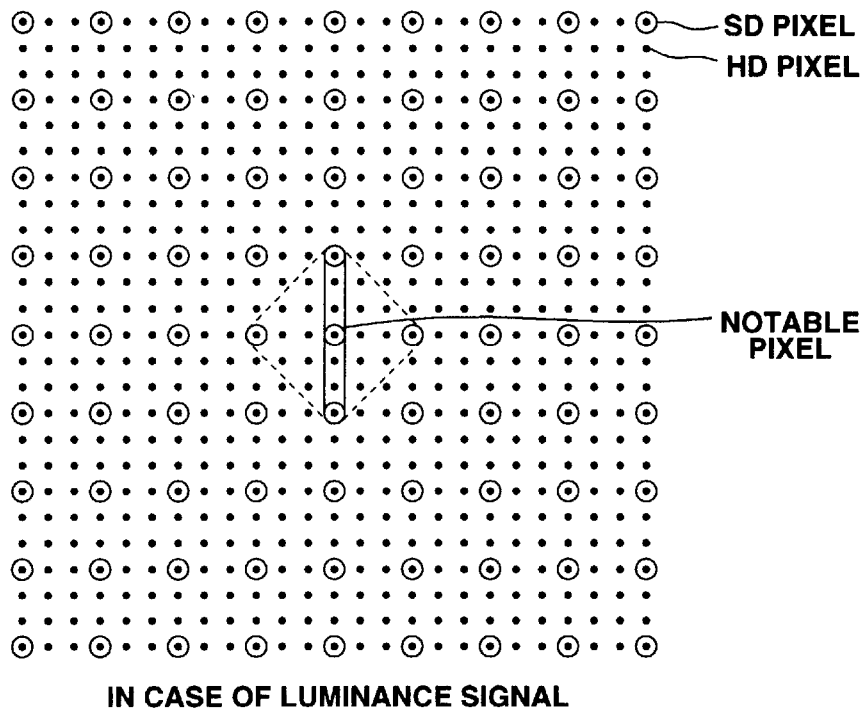
FIGS. 13A and 13B are views showing examples of the structure of a class tap for classification.

That is, in the case of the luminance signal, a class tap is constituted by five SD pixels in a lozenge-shaped range centering the notable pixel, as surrounded by a dotted line in FIG. 13A, with respect to any of the four patterns of prediction taps. The difference between the maximum value and the minimum value of pixel values of the five pixels becomes a dynamic range DR. By using this dynamic range DR, vertically arrayed three pixels (three pixels surrounded by a solid line in FIG. 13A) of the class tap are processed by one-bit ADRC processing. Then, the pattern of pixel values of the three pixels to which a tap code corresponding to the prediction tap is appended is used as the class of the notable pixel. Therefore, in this case, the pattern of pixel values obtained by carrying out one-bit ADRC processing on the vertically arrayed three pixels is expressed by three bits, and the tap code has two bits. Thus, the luminance signal is classified into any one of $32(=2^5)$ classes.

Figure 13B:
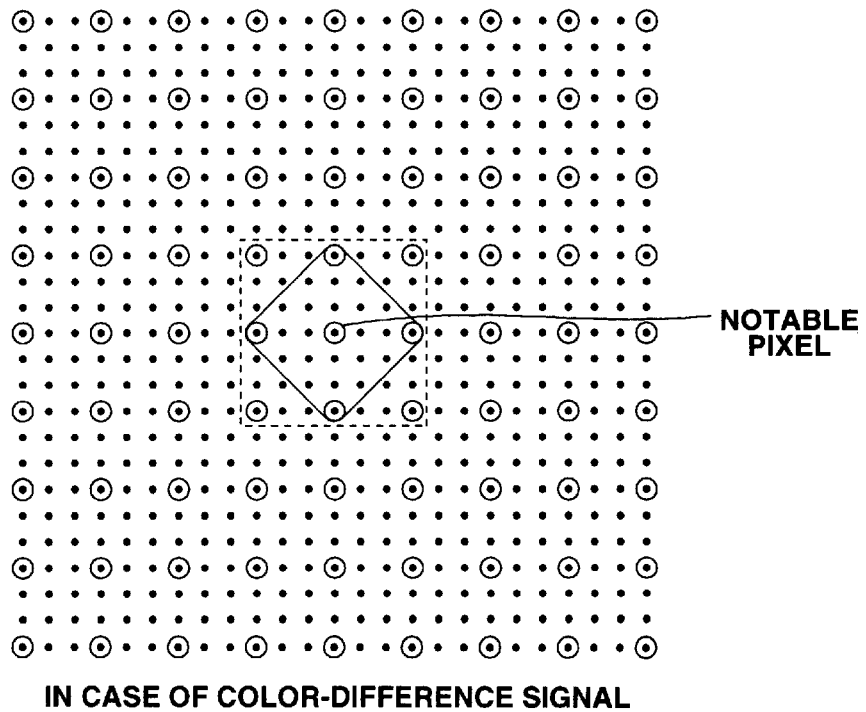

On the other hand, in the case of the color-difference signal, a class tap is constituted by nine SD pixels in a square range centering the notable pixel, as surrounded by a dotted line in FIG. 13B. The difference between the maximum value and the minimum value of pixel values of the nine pixels becomes a dynamic range DR. By using this dynamic range DR, five SD pixels in a lozenge-shaped range centering the notable pixel (surrounded by a solid line in FIG. 13B) of the class tap are processed by one-bit ADRC processing. Then, the pattern of pixel values of the five pixels is used as the class of the notable pixel. Therefore, in this case, since the pattern of pixel values obtained by carrying out one-bit ADRC processing on the five pixels centering the notable pixel is expressed by five bits, the color-difference signal is also classified into any one of $32(=2^5)$ classes, similarly to the luminance signal.

After the class of the notable pixel is determined as described above, the classification adaptive processing (prediction coefficient and prediction value calculation) circuit 33 establishes and solves the normal equation of Equation 13 by using the prediction tap and the HD picture for every class with respect to each of the four patterns of prediction taps, thereby finding a set of prediction coefficients w for every class with respect to each of the four patterns of prediction taps. The set of prediction coefficients w for every class found with respect to each of the four patterns of prediction taps is supplied to and stored on the memory 35.

In addition, the classification adaptive processing (prediction coefficient and prediction value calculation) circuit 33 calculates the linear primary formula of Equation 1 from each set of prediction coefficients w for every class with respect to each of the four patterns of prediction taps and from each of the four patterns of prediction taps, thereby finding the prediction value of the HD picture obtained from each of the four patterns of prediction taps and outputting the prediction value to the prediction error calculating circuit 34.

The prediction error calculating circuit 34, at step S14, finds the prediction error of the prediction value of the HD picture for each of the four patterns of prediction taps supplied from the classification adaptive processing (prediction coefficient and prediction value calculation) circuit 33, with respect to the pixel value of the original HD picture. In other words, the prediction error calculating circuit 34 finds the square sum of the difference between the prediction values of the nine pixels of the HD picture and the pixel values of the pixels of the original HD picture, as the prediction error, with respect to each of the four patterns of prediction taps. Then, the operation proceeds to step S15, where a prediction tap having the minimum prediction error is detected with respect to the notable pixel. A tap pattern code corresponding to this prediction tap is outputted to the tap pattern code appending circuit 36.

At step S16, the tap pattern code appending circuit 36 outputs, as the tap pattern code, two bits on the LSB side of the pixel value of the notable pixel from among the SD pixels constituting the SD picture from the thinning circuit 31 (in this embodiment, only with respect to the luminance signal).

After that, the operation proceeds to step S17, where it is decided whether or not the tap pattern code has been appended to all the SD pixels. If it is decided that the tap pattern code has not been appended to all the SD pixels, the operation returns to step S12, where similar processing is repeated by newly using any of the SD pixels to which the tap pattern code is not appended, as a notable pixel. On the other hand, if it is decided at step S17 that the tap pattern code has been appended to all the SD pixels, the memory 35 outputs the set of prediction coefficients w for every class with respect to each of the four patterns of prediction taps, at step S18. Then, the operation ends.

The preprocessing section 21 temporarily appends the tap pattern code of the prediction tap which minimizes the prediction error, to each of the SD pixels constituting the SD picture outputted by the thinning circuit 31 (in this case, pixels having the average value of the 3×3 HD pixels as the pixel value), as described above.

Figure 14:
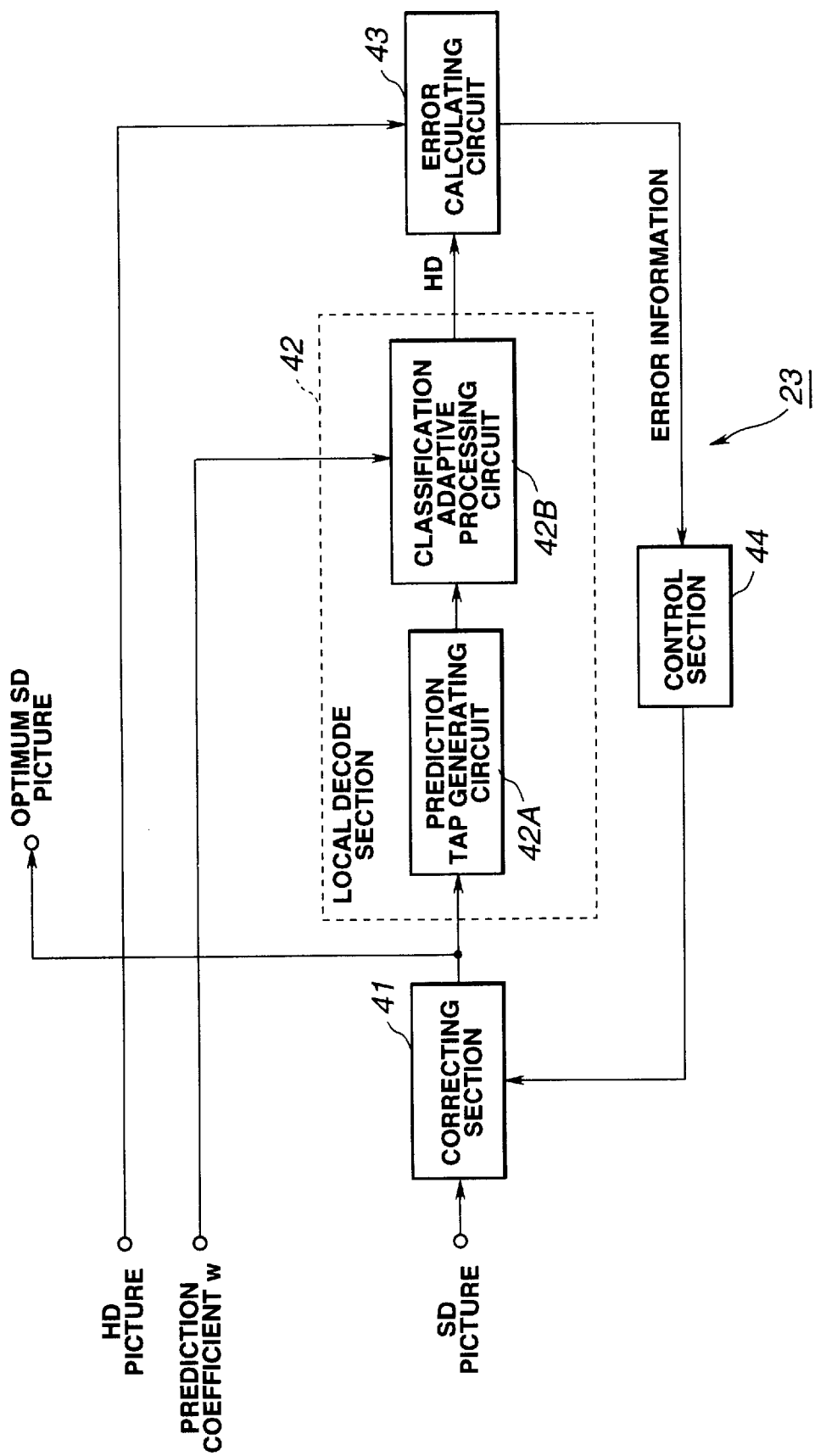
FIG. 14 is a block diagram showing an example of the structure of an optimizing section 23 of FIG. 3.

FIG. 14 shows an example of the structure of the optimizing section 23 of FIG. 3. In FIG. 14, portions having structures basically similar to those in FIG. 25 are denoted by the same numerals. That is, the optimizing section 23 has the structure basically similar to that of the picture encoding device of FIG. 25 except for that it does not have the thinning section 121 and has a local decode section 42 in place of the local decode section 122.

The local decode section 42 includes a prediction tap generating circuit 42A and a classification adaptive processing circuit 42B, and is supplied with the SD picture from the correcting section 41. The prediction tap generating circuit 42A forms (generates) a prediction tap corresponding to the tap pattern code located on the LSB side of the SD pixel of the SD picture supplied from the correcting section 41, and supplies the prediction tap to the classification adaptive processing circuit 42B. The classification adaptive processing circuit 42B is supplied with an SD pixel for classification and the set of prediction coefficients w for every class with respect to each of the four patterns of prediction taps, as well as the prediction tap. The classification adaptive processing circuit 42B classifies the notable pixel constituting the prediction tap by using the SD pixel for classification as described with reference to FIG. 13, and calculates the linear primary formula of Equation 1 from the set of prediction coefficients w corresponding to the class and the prediction tap, thereby finding the prediction value of pixel values of 3×3 HD pixels centering the SD pixel as the notable pixel, surrounded by a dotted line in FIG. 6. This prediction value is supplied to the error calculating section 43.

Figure 28:
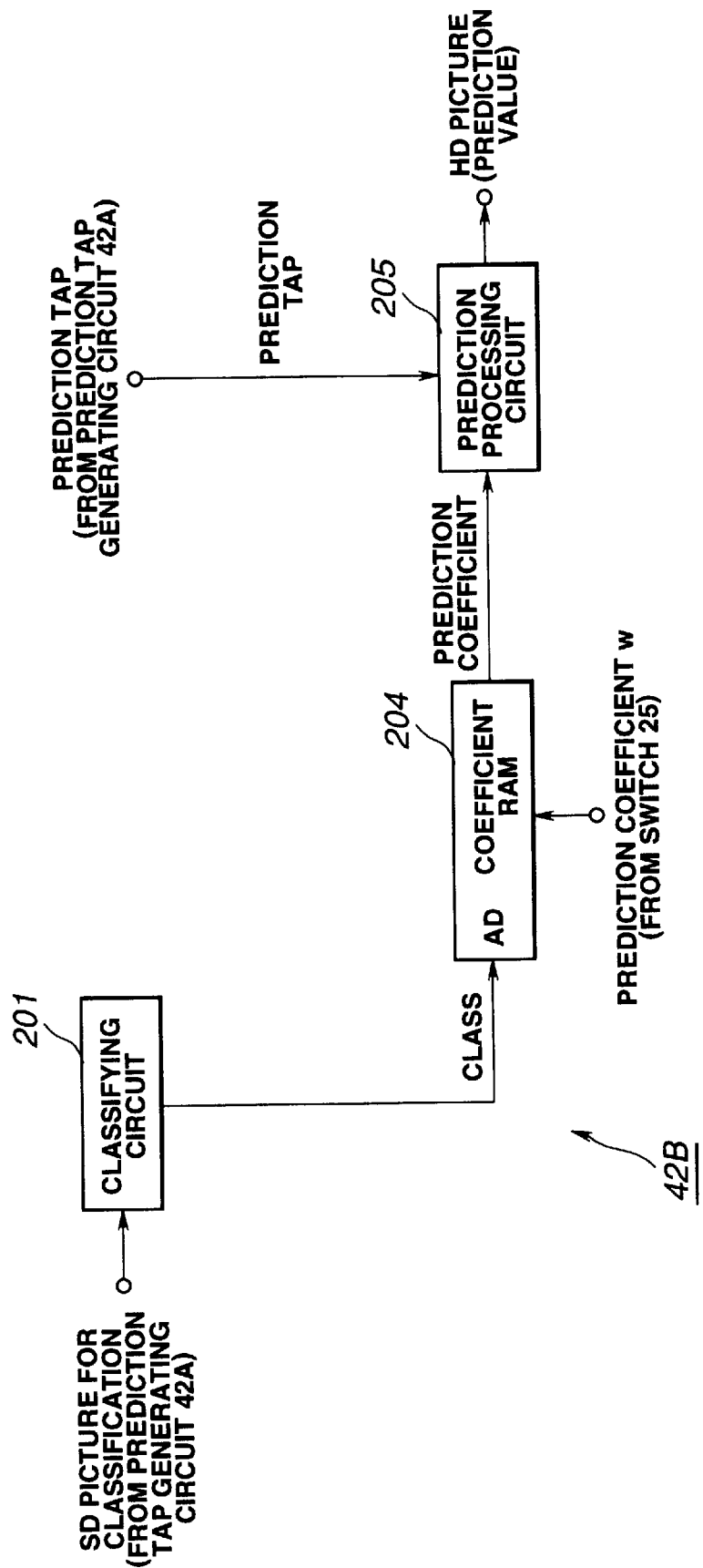
FIG. 28 is a block diagram showing an example of the structure of classification adaptive processing circuits 42B and 74.

The structure of the classification adaptive processing circuit shown in FIG. 28 will now be described. The classification adaptive processing circuit shown in FIG. 28 includes a classifying circuit 201, a coefficient RAM 204 and a prediction processing circuit 205. This classification adaptive processing circuit 42B has the same structure as a part of one of the classification adaptive processing circuits of the classification adaptive processing (prediction coefficient and prediction value calculation) circuit 33 shown in FIG. 26, and the same portion is denoted by the same numeral and will not be described further in detail.

Referring to the flowchart of FIG. 15, the operation of the optimizing section 23 will now be described.

On receiving the SD picture, the optimizing section 23 uses one of SD pixels constituting the SD picture as a notable pixel, and at step S31, initializes a variable A expressing the correction quantity for correcting the pixel value of the notable pixel to, for example, 0. Also, at step S31, a variable S expressing the change quantity (hereinafter referred to as offset quantity) for changing the correction quantity is set to 4 or 1 as an initial value.

Specifically, for the luminance signal, since two bits on the LSB side express the tap pattern code and do not constitute the pixel value, as described above, the offset quantity S is set to $4(=2^2)$. For the color-difference signal, since all bits constitute the pixel value, the offset quantity is set to $1(=2^0)$.

In addition, at step S31, a variable i for counting the number of times of correction of the notable pixel is set to −1 as an initial value, and the operation proceeds to step S32. At step S32, the number of times i makes increment only of 1, and the operation proceeds to step S33. In the case where adaptive processing is carried out using a correction value which is obtained by correcting the pixel value of the notable pixel only by the correction quantity Δ, a prediction error E of the prediction value of the HD pixel affected by the correction is calculated.

In this case, the correcting section 41 adds the correction quantity Δ to the pixel value of the notable pixel, and outputs the addition value as the pixel value of the notable pixel to the local decode section 42. If the processing of step S33 is first carried out on the notable pixel, that is, if the number of times i=0, the correction quantity Δ remains as the initial value of 0. Therefore, the correcting section 41 directly outputs the pixel value of the notable pixel.

In the local decode section 42, the prediction tap generating circuit 42A forms the prediction tap in accordance with the tap pattern code located on the two bits on the LSB side of the pixel value of the notable pixel, and outputs the prediction tap to the classification adaptive processing circuit 42B. The classification adaptive processing circuit 42B first classifies the notable pixel similarly to the case of the classification adaptive processing (prediction coefficient and prediction value calculation) circuit 33 of FIG. 5. Also, the classification adaptive processing circuit 42B calculates the linear primary formula of Equation 1 from the prediction coefficient corresponding to the class and from the prediction tap from the prediction generating circuit 42A, thereby finding the prediction value of the pixel value of the HD pixel.

In addition, in the case where the pixel value of the notable pixel is corrected by the correction quantity Δ, the classification adaptive processing circuit 42B similarly finds the prediction value with respect the pixel value of the HD pixel.

Figure 16:
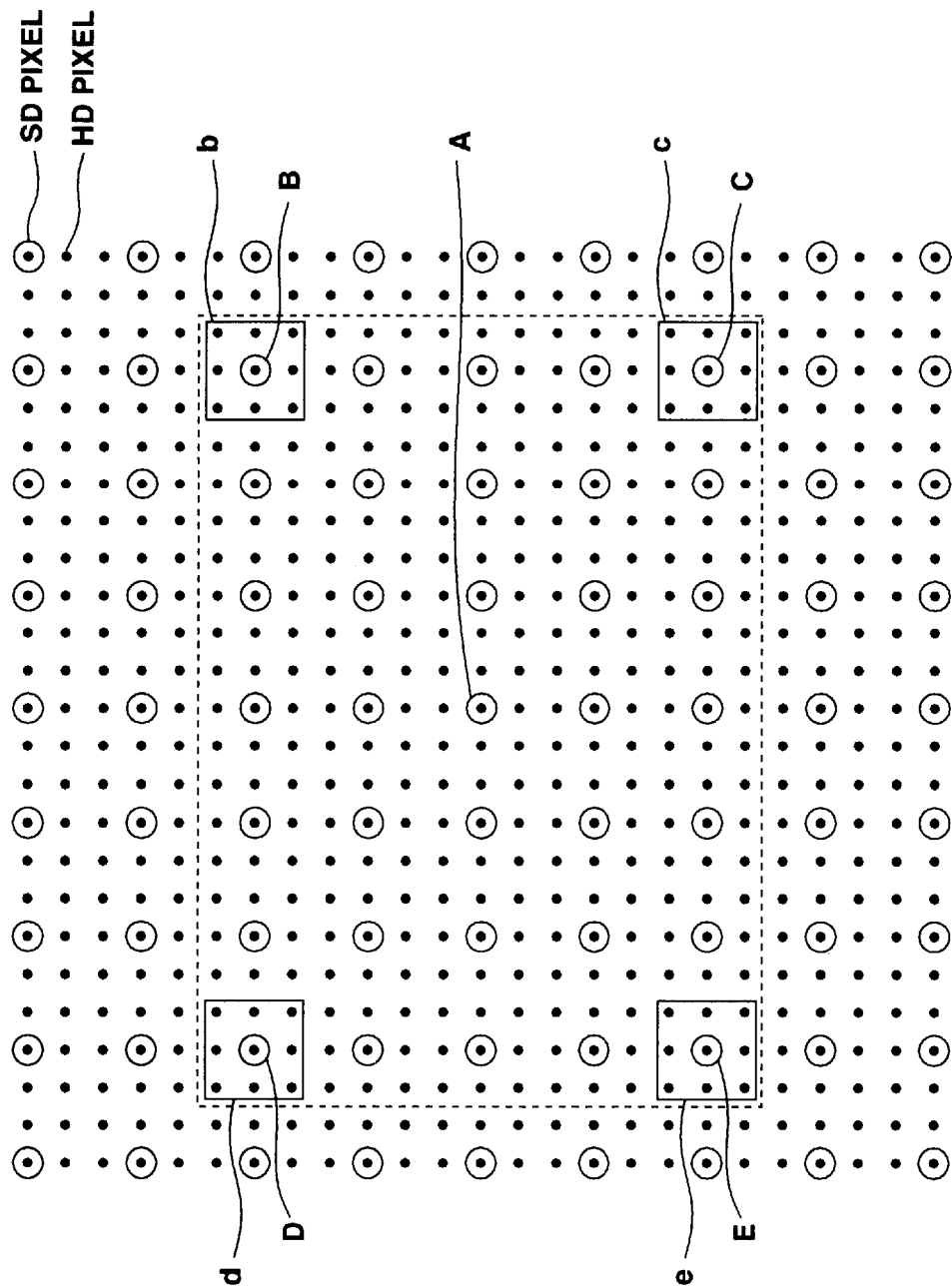
FIG. 16 is a view for explaining the processing of step S33 of FIG. 15.

Specifically, it is now assumed that an SD pixel A is corrected as a notable pixel, as shown in FIG. 16. In this embodiment, the broadest range of prediction tap is obtained in the case where a prediction tap is constituted by 7×5 SD pixels, as shown in FIG. 10. In this case where the prediction tap is constituted by 7×5 SD pixels, the SD pixel A is included in the prediction tap. An SD pixel farthest from the SD pixel A becomes the notable pixel in the case where SD pixels B, C, D and E are used as notable pixels in the prediction tap constituted by 7×5 pixels. In this case where the SD pixels B, C, D and E are used as notable pixels in the prediction tap constituted by 7×5 pixels, in this embodiment, the prediction values of the 3×3 pixels in ranges b, c, d and e surrounded by solid lines in FIG. 16 are found. Therefore, if the pixel value of the SD pixel A as the notable pixel is corrected, the prediction values of 21×15 HD pixels in a range indicated by a dotted line in FIG. 16, which is a minimum rectangle including the ranges b, c, d and e, are affected by the correction in the worst case.

Thus, in this embodiment, the classification adaptive processing circuit 42B finds the prediction values of such 21×15 HD pixels.

The prediction value of the HD pixel found by the classification adaptive processing circuit 42B is supplied to the error calculating section 43. The error calculating section 43 subtracts the true pixel value of the corresponding HD pixel from the prediction value of the HD pixel supplied from the classification adaptive processing circuit 42B, and finds the square sum of the prediction error, which is, the subtraction value. This square sum is supplied as error information E to the control section 44.

On receiving the error information from the error calculating section 43, the control section 44 decides whether the number of times i is 0 or not, at step S34. If it is decided at step S34 that the number of times i is 0, that is, if the error information E received by the control section 44 is obtained without carrying out correction of the notable pixel, the operation proceeds to step S35. A variable $E_0$ for storing the error information obtained without carrying out correction of the notable pixel (error information at the time of non-correction) is set to the error information E, and a variable E' for storing the previously obtained error information is also set to the error information E. In addition, at step S35, the correction quantity Δ makes increment by the offset quantity S, and the control section 44 controls the correcting section 41 to correct the pixel value of the notable pixel only by the correction quantity Δ thus obtained. After that, the operation returns to step S32, and similar processing is repeated.

In this case, since the number of times i makes increment by 1 so as to become 1 at step S32, it is decided at step S34 that the number of times i is not 0, and the operation proceeds to step S36. At step S36, it is decided that the number of times i is 1, and the operation proceeds to step S37, where it is decided whether or not the previous error information E' is equal to or greater than the current error information E. If it is decided at step S37 that the previous error information E' is not equal to or greater than the current error information E, that is, if the pixel value of the notable pixel is corrected by the correction quantity Δ so as to increase the current error information E to be greater than the previous error information E' (error information in the case where no correction is carried out), the operation proceeds to step S38. The control section 44 defines the offset quantity S multiplied by −1 as a new offset quantity S, and makes increment on the correction quantity Δ by twice the offset quantity S. Then, the operation returns to step S32.

Specifically, if the pixel value of the notable pixel is corrected by the correction quantity Δ (in this case, Δ=S), thereby increasing the error in comparison with the case where no correction is carried out, the sign of the offset quantity S is reversed. (In this embodiment, since the offset quantity S is set to a positive value at step S31, the sign of the offset quantity S is reversed from positive to negative at step S38.) In addition, the correction quantity Δ which was previously S is caused to be −S.

On the other hand, if it is decided at step S37 that the previous error information E' is equal to or greater than the current error information E, that is, if the pixel value of the notable pixel is corrected by the correction quantity Δ so as to decrease the current error information E to be smaller than (or equal to) the previous error information E', the operation proceeds to step S39. The control section 44 makes increment on the correction quantity Δ by the offset quantity S, and updates the previous error information E' to the current error information E. Then, the operation returns to step S32.

In this case, since the number of times i makes further increment by 1 so as to become 2 at step S32, it is decided at step S34 or S36 that the number of times is not 0 or 1. As a result, the operation proceeds from step S36 to step S40. At step S40, it is decided whether the number of times i is 2 or not. At this point, since the number of times i is 2, it is decided at step S40 that the number of times i is 2. The operation proceeds to step S41, where it is decided whether or not the error information $E_0$ at the time of non-correction is equal to or smaller than the current error information E and whether or not the offset quantity S is negative.

If it is decided at step S41 that the error information $E_0$ at the time of non-correction is equal to or smaller than the current error information E and that the offset quantity S is negative, that is, if the error is increased by correcting the notable pixel by +S or −S in comparison with the case where no correction is carried out, the operation proceeds to step S42, where the correction quantity Δ becomes 0. Then, the operation proceeds to step S47.

On the other hand, if it is decided at step S41 that the error information E, at the time of non-correction is not equal to or smaller than the current error information E, or that the offset quantity S is not negative, the operation proceeds to step S44, where it is decided whether or not the previous error information E' is equal to or greater than the current error information E. If it is decided at step S44 that the previous error information E' is equal to or greater than the current error information E, that is, if the pixel value of the notable pixel is corrected by the correction quantity Δ so as to decrease the current error information E to be smaller than the previous error information, the operation proceeds to step S45. The control section 44 makes increment on the correction quantity Δ by the offset quantity S, and updates the previous error information E' to the current error information E. Then, the operation returns to step S32.

In this case, since the number of times i makes further increment by 1 so as to become 3 at step S32, it is decided at step S34, S36, or S40 that the number of times is not 0, 1, or 2. As a result, the operation proceeds from step S40 to step S44. At step S44, loop processing of steps S32 to S34, S36, S40, S44 and S45 is repeated until it is decided that the previous error information E' is not equal to or greater than the current error information E.

If it is decided at step S44 that the previous error information E' is not equal to or greater than the current error information E, that is, the pixel value of the notable pixel is corrected by the correction quantity Δ so as to increase the current error information E to be greater than the previous error information E', the operation proceeds to step S46. The control section 44 makes decrement on the correction quantity Δ by the offset quantity S, and the operation proceeds to step S47. That is, in this case, the correction quantity Δ has a value prior to the increase in the error.

At step S47, the control section 44 controls the correcting section 41, thereby correcting the pixel value of the notable pixel by the correction quantity Δ obtained at step S42 or S46. Thus, the pixel value of the notable pixel is corrected to be an optimum pixel value which minimizes the prediction error, for obtaining the prediction value by adaptive processing.

Then, the operation proceeds to step S48, where it is decided whether not processing has been carried out with respect to all the SD pixels as notable pixels. If it is decided at step S48 that processing has not been carried out with respect to all the SD pixels as notable pixels, the operation returns to step S31, and similar processing is repeated by newly using the SD pixel which is not used as a notable pixel, as a notable pixel. On the other hand, if it is decided at step S48 that processing has been carried out with respect to all the SD pixels as notable pixels, the operation ends.

Thus, the pixel value of the SD picture is optimized to be an optimum pixel value for finding the prediction value of the HD picture.

Figure 17:
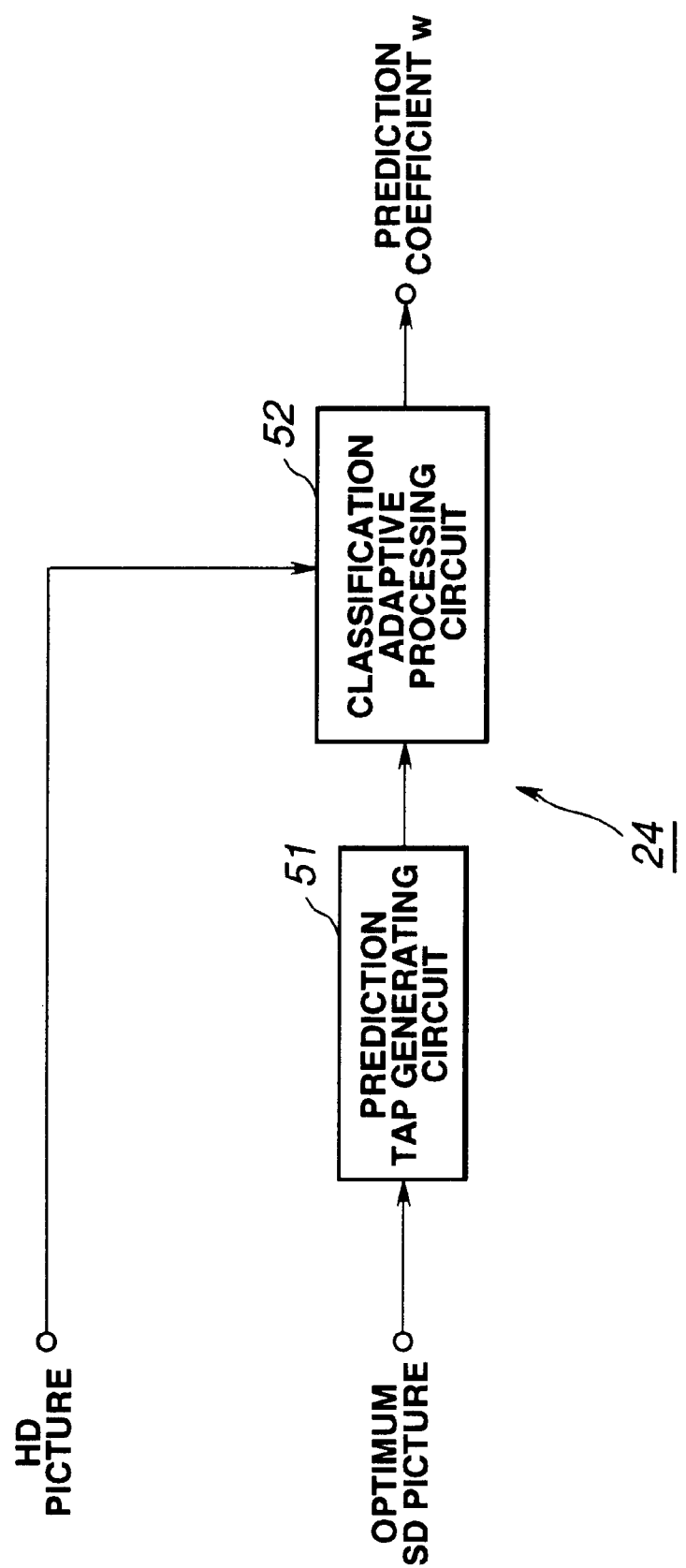
FIG. 17 is a block diagram showing an example of the structure of an adaptive processing section 24 of FIG. 3.

FIG. 17 shows an example of the structure of the adaptive processing section 24 of FIG. 3.

A prediction tap generating circuit 51 is supplied with the optimum SD picture from the optimizing section 23. Similar to the prediction tap generating circuit 42A of FIG. 14, the prediction tap generating circuit 51 detects the tap pattern code located on the two bits on the LSB side of the pixel value, and forms a prediction tap in accordance with the tap pattern code. The prediction tap thus obtained is supplied to a classification adaptive processing circuit 52.

The classification adaptive processing circuit 52 is supplied with the optimum SD picture for classification and the original HD picture as well as the prediction tap. The classification adaptive processing circuit 52 classifies the notable pixel constituting the prediction tap similarly to the case of FIG. 13, and establishes the normal equation of Equation 13 using the prediction tap and the HD picture with respect to each class thus obtained. Then the classification adaptive processing circuit 52 solves the normal equation for each class, thereby finding and outputting a set of prediction coefficients w with respect to each of new four patterns of prediction taps.

Figure 18:
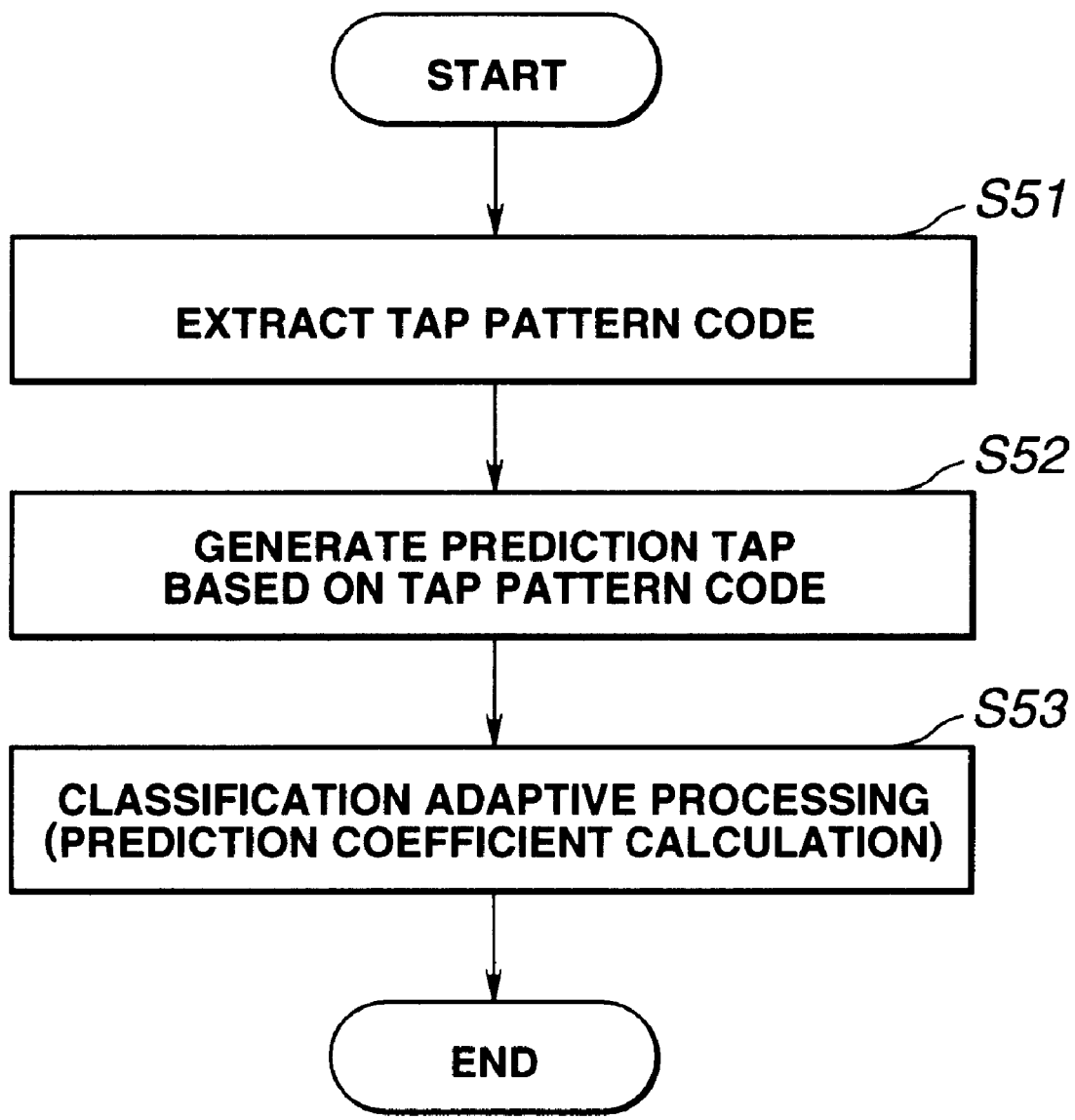
FIG. 18 is a flowchart for explaining the processing of the adaptive processing section 24 of FIG. 17.

The operation of the adaptive processing section 24 will now be described with reference to the flowchart of FIG. 18. On receiving the optimum SD picture, the prediction tap generating circuit 51 detects (extracts) the tap pattern code appended to each SD pixel constituting the optimum SD picture, at step S51. Then, the operation proceeds to step S52, where the prediction tap generating circuit 51 forms the prediction tap based on the extracted tap pattern code. The prediction tap generating circuit 51 outputs the prediction tap thus formed to the classification adaptive processing circuit 52. The classification adaptive processing circuit 52 classifies the notable pixel constituting the prediction tap, and establishes and solves the normal equation using the prediction tap and the HD picture with respect to each class thus obtained, thereby finding and outputting the prediction coefficients w, at step S53. Then, the operation ends.

Thus, the adaptive processing section 24 finds the set of prediction coefficients w for every class with respect to each of the four patterns of prediction taps which minimizes the prediction error, for obtaining the original HD picture from the optimum SD picture. The set of prediction coefficients w for every class with respect to each of the four patterns of prediction taps is supplied to the optimizing section 23 and the prediction tap pattern deciding section 26, as described above, and is used for adaptive processing (calculation of the linear primary formula of Equation 1).

Another embodiment of the adaptive processing section 24 will now be described. In this embodiment, the prediction tap generating circuit 51 has a structure similar to that of the prediction tap generating circuit 32 of the preprocessing section 21 of FIG. 5. In short, the prediction tap generating circuit 51 forms all the four patterns of prediction taps and supplies these four patterns to the classification adaptive processing circuit 52, instead of detecting the tap pattern code located on the two bits on the LSB side of the pixel value and forming the prediction tap in accordance with the tap pattern code. The classification adaptive processing circuit 52 has classification adaptive processing circuits (for the luminance signal) for calculating four prediction coefficients corresponding to the respective four patterns of prediction taps. Each of these classification adaptive processing circuits has a structure similar to a part of one of the classification adaptive processing circuits of the classification adaptive processing (prediction coefficient and prediction value calculation) circuit 33 of FIG. 26.

That is, each classification adaptive processing circuit is supplied with the each pattern of prediction tap with respect to each HD picture and the optimum SD picture for classification, thus carrying out classification. Each classification adaptive processing circuit stores, for every class, one frame of the HD picture and the prediction tap with respect to the HD picture onto the teacher data memory and the prediction tap memory. After that, each classification adaptive processing circuit generates a new set of prediction coefficients w for every class with respect to four patterns of prediction taps, by the operation similar to the operation of the learning device of FIG. 24.

Figure 19:
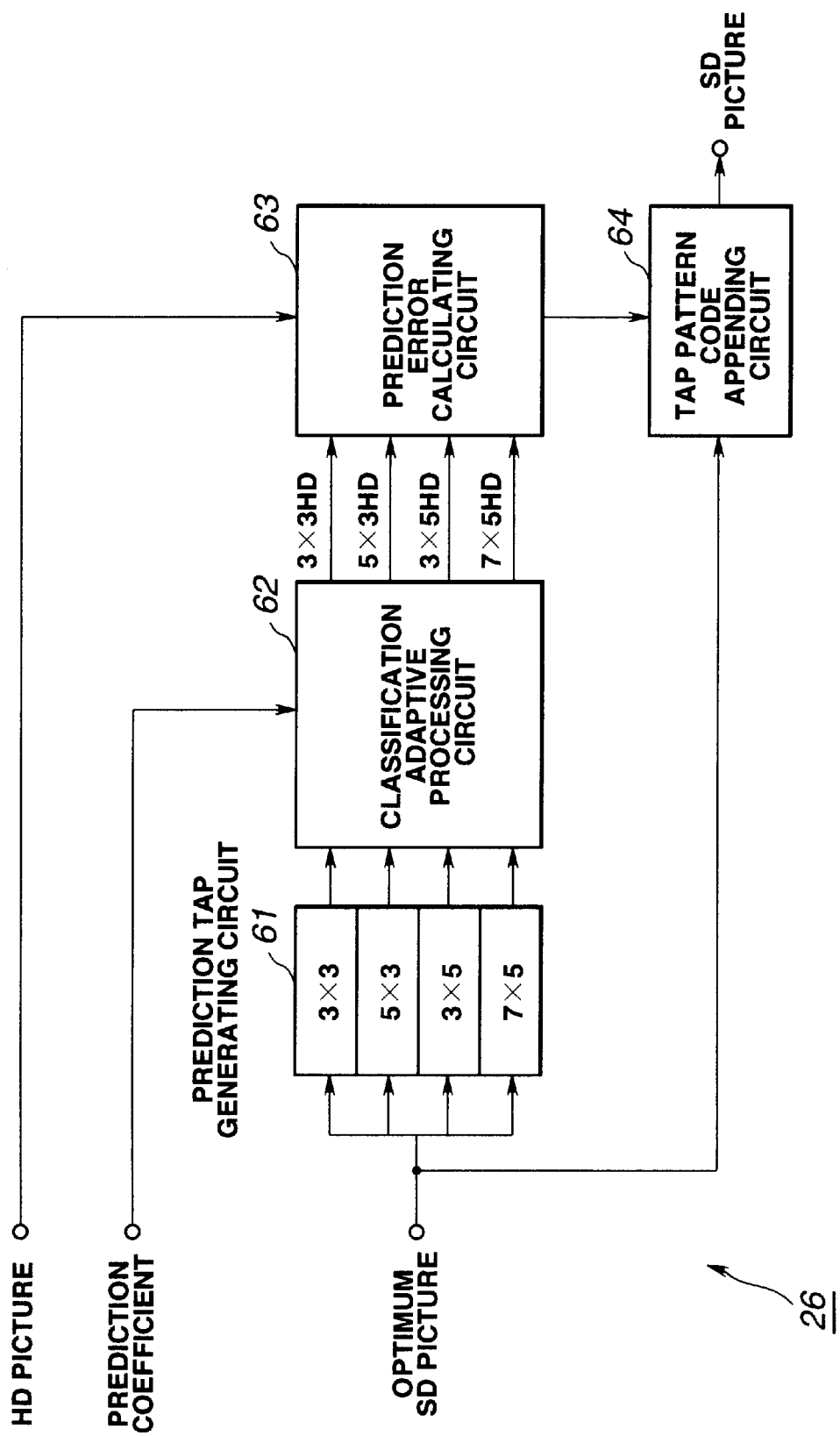
FIG. 19 is a block diagram showing an example of the structure of a prediction tap pattern deciding section 26 of FIG. 3.

FIG. 19 shows an example of the structure of the prediction tap pattern deciding section 26 of FIG. 3.

The prediction tap pattern deciding section 26 includes a prediction tap generating circuit 61, a classification adaptive processing circuit 62, a prediction error calculating circuit 63, and a tap pattern code changing circuit 64, as shown in FIG. 19. The prediction tap generating circuit 61, the classification adaptive processing circuit 62, the prediction error calculating circuit 63, and the tap pattern code changing circuit 64 have structures basically similar to those of the prediction tap generating circuit 32, the classification adaptive processing (prediction coefficient and prediction value calculation) circuit 33, the prediction error calculating circuit 34, and the tap pattern code appending circuit 36 of the preprocessing section 21 of FIG. 5, respectively.

Figure 20:
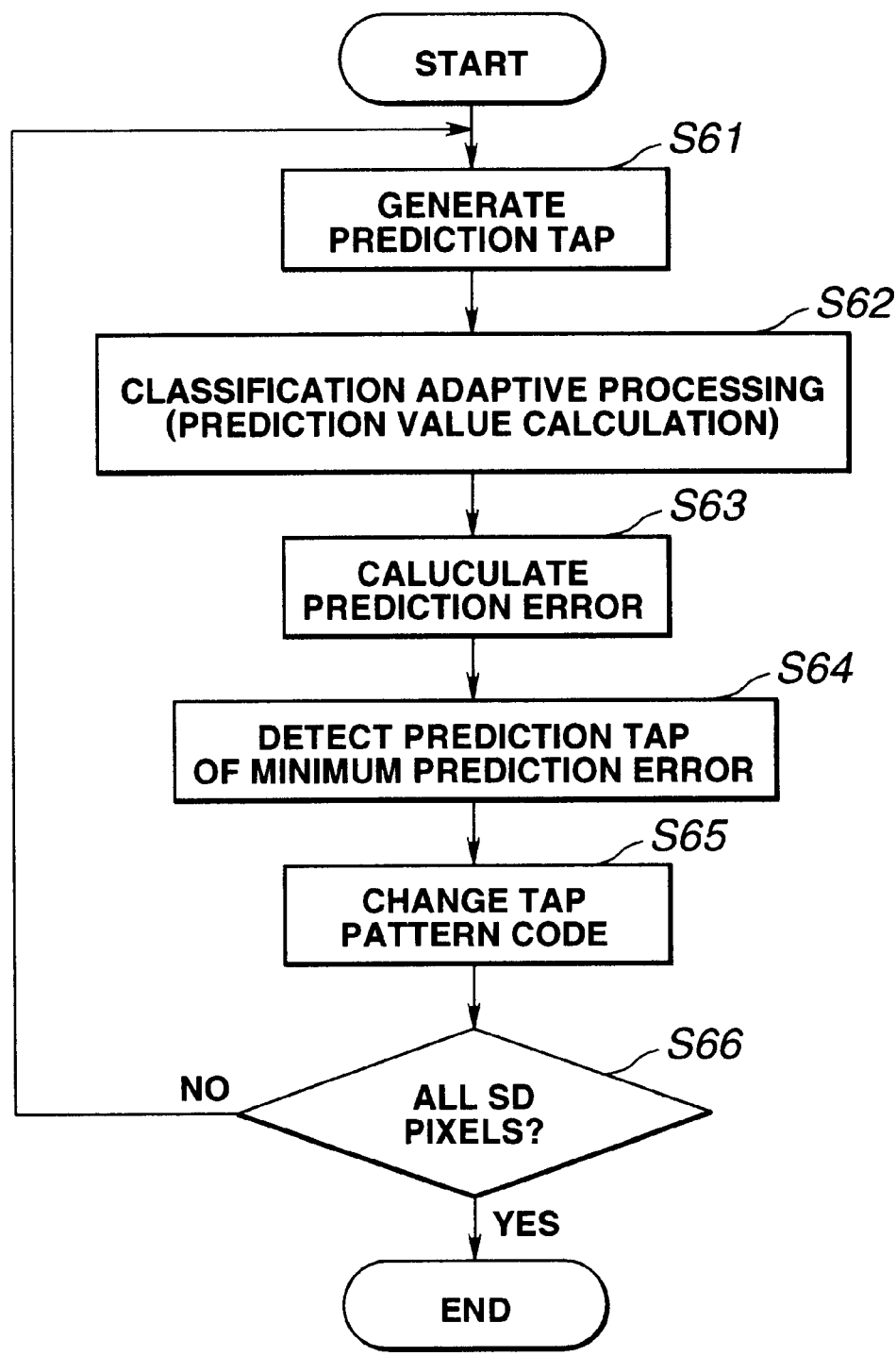
FIG. 20 is a flowchart for explaining the processing of the prediction tap pattern deciding section 26 of FIG. 19.

The operation of the prediction tap pattern deciding section 26 will now be described with reference to the flowchart of FIG. 20.

The prediction tap pattern deciding section 26 is supplied with the optimum SD picture, the set of prediction coefficients w for every class with respect to each of the four patterns of prediction taps, and the HD picture. The optimum SD picture is supplied to the prediction tap generating circuit 61 and the tap pattern code changing circuit 64. The set of prediction coefficients w for every class with respect to each of the four patterns of prediction taps or the HD picture is supplied to the classification adaptive processing circuit 62 or the prediction error calculating circuit 63.

On receiving the optimum SD picture, the prediction tap generating circuit 61 uses one of SD pixels of the optimum SD picture as a notable pixel, similarly to the prediction tap generating circuit 32 of FIG. 5, and forms the four patterns of prediction taps shown in FIGS. 7 to 10 with respect to the notable pixel, at step S61. These four patterns of prediction taps are outputted to the classification adaptive processing circuit 62.

On receiving the four patterns of prediction taps with respect to the notable pixel, the classification adaptive processing circuit 62 calculates the linear primary formula of Equation 1 by using each of the four pattern of prediction taps and the set of prediction coefficients w for the corresponding class, thereby finding the prediction value of the pixel of the HD picture obtained from each of the four patterns of prediction taps and outputting the prediction value to the prediction error calculating circuit 63, at step S62.

Figure 11:
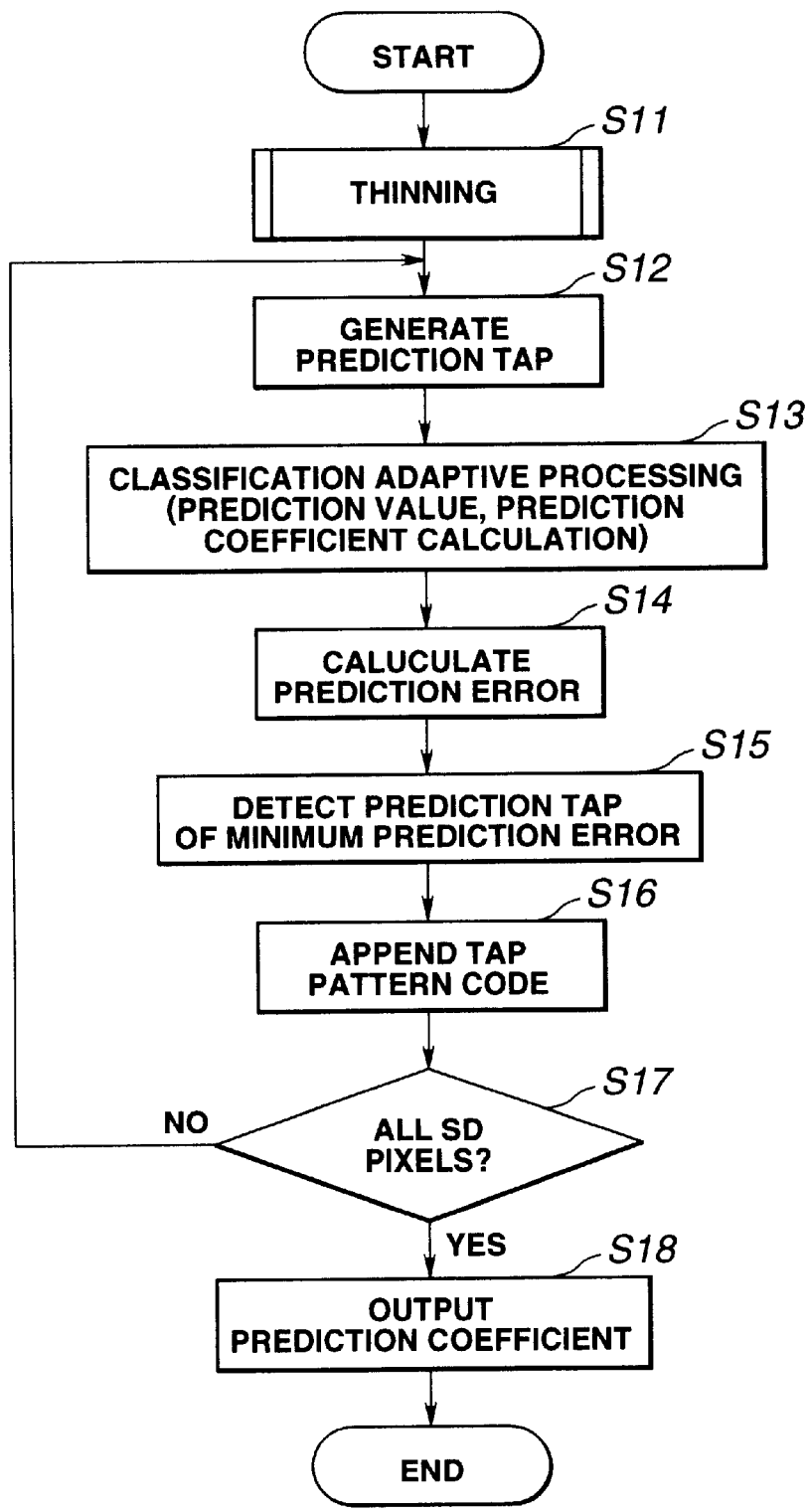
FIG. 11 is a flowchart for explaining the processing of the preprocessing section 21 of FIG. 5.

The prediction error calculating circuit 63, at step S63 or S64, carries out processing similar to the processing of step S14 or S15 of FIG. 11 carried out by the prediction error calculating circuit 34 of FIG. 5. Thus, the prediction error calculating circuit 63 outputs a tap pattern code which minimizes the prediction error from among the four patterns of prediction taps to the tap pattern code changing circuit 64.

The tap pattern code changing circuit 64 changes the tap pattern code appended to the two bits on the LSB side of the notable pixel (SD pixel of the optimum SD picture), to the tap pattern code supplied from the prediction error calculating circuit 63, at step 65. Then, the operation proceeds to step S66.

At step S66, it is decided whether or not processing has been carried out with respect to all the SD pixels. If it is decided that processing has not been carried out with respect to all the SD pixels, the operation returns to step S61, and similar processing is repeated by newly using the SD pixel which has not been used as a notable pixel, as a notable pixel. On the other hand, if it is decided at step S66 that processing has been carried out with respect to all the SD pixels, the operation ends.

In the prediction tap pattern deciding section 26, as described above, the tap pattern code is changed to a tap pattern code corresponding to the prediction tap which reduces the prediction error, by using the set of prediction coefficients w with respect to each of the four patterns of prediction taps obtained by the adaptive processing section 24.

Figure 21:
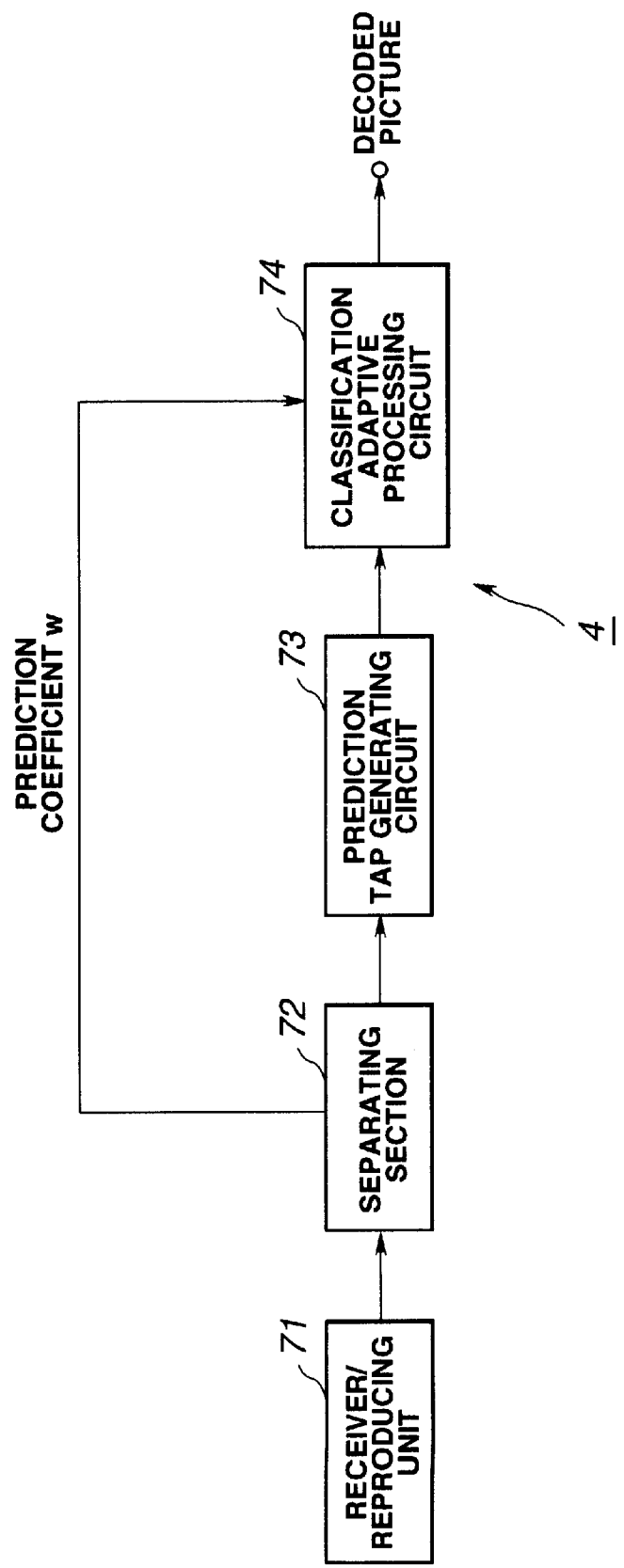
FIG. 21 is a block diagram showing an example of the structure of a receiving unit 4 of FIG. 1

FIG. 21 shows an example of the structure of the receiving unit 4 of FIG. 1.

A receiver/reproducing unit 71 reproduces the coded data recorded on the recording medium 2 or receives the coded data transmitted through the transmission line 3, and supplies the coded data to a separating section 72. The separating section 72 separates the coded data into picture data of the SD picture and the set of prediction coefficients w for every class with respect to each of the four patterns of prediction taps. The picture data of the SD picture is supplied to a prediction tap generating circuit 73, and the set of prediction coefficients w for every class with respect to each of the four patterns of prediction taps is supplied to a classification adaptive processing circuit 74.

The prediction tap generating circuit 73 and the classification adaptive processing circuit 74 have structure similar to those of the prediction tap generating circuit 42A and the classification adaptive processing circuit 42B (FIG. 27) constituting the local decode section 42 of the optimizing section 23 of FIG. 14, respectively. Therefore, similar to the case of the local decode section 42, the prediction value of the HD picture is found and outputted as a decoded picture. This decoded picture is substantially the same as the original picture, as described above.

On the receiving side, even when the receiving unit 4 as shown in FIG. 21 is not used, the decoded picture may be obtained by carrying out normal interpolation using a device for decoding a thinned picture by simple interpolation, without using the prediction coefficients. However, the decoded picture obtained in this case is deteriorated in picture quality (resolution).

As described above, one of the pixels constituting the SD picture obtained by compressing the HD picture is used as a notable pixel, and plural patterns of prediction taps are formed with respect to the notable pixel. By linear combination between the prediction tap and the prediction coefficient, adaptive processing for finding the prediction value of the HD picture is carried out. The prediction error of the prediction value obtained from each of the plural patterns of prediction taps is calculated, and the tap pattern code corresponding to the prediction tap pattern which minimizes the prediction error, from among the plural patterns of prediction taps, is appended to the pixel value of the notable pixel. Therefore, adaptive processing is carried out by using the prediction tap corresponding to the local characteristics of the picture. As a result, a decoded picture of high picture quality may be obtained.

Also, since the tap pattern code of two bits is arranged in place of two bits on the LSB side of the pixel value, increase in data quantity may be prevented. As the tap pattern code is arranged on the LSB side of the pixel value, the picture quality is not significantly deteriorated.

In addition, since the optimizing section 23 optimizes the SD picture by carrying out adaptive processing using the prediction tap which minimizes the error, a decoded picture substantially equal to the original HD picture may be obtained.

Also, the adaptive processing section 24 carries out adaptive processing using the optimum SD picture so as to update the set of prediction coefficients for every class with respect to each of the plural patterns of prediction taps to a more appropriate set of prediction coefficients. The prediction tap pattern deciding section 26 revises the prediction tap by using the updated set of prediction coefficients for every class with respect to each of the plural patterns of prediction taps. Thus, a decoded picture of further improved picture quality may be obtained.

In the above description, this invention is applied to the picture processing device for coding/decoding an HD picture. However, this invention may also be applied to the case where a picture or the like of standard resolution such as an SD picture is to be coded/decoded. For example, this invention may also be applied to the case where television signals of the standard system such as the NTSC system are to be coded/decoded. Particularly, this invention is effective for coding/decoding television signals of a so-called high-vision system having a large data quantity. Also, this invention may be applied to the case where so-called hierarchical coding is to be carried out.

In the above-described embodiment, plural patterns of prediction taps are prepared only for the luminance signal, while only the prediction tap of 5×7 pixels is used for the color-difference signal. However, the color-difference signal may also be processed similarly to the luminance signal.

Also, though the tap pattern code consists of two bits in the above-described embodiment, the tap pattern code is not limited to two bits. However, it is preferred that a smaller number of bits are used.

In addition, in the above-described embodiment, the tap pattern code is arranged in place of the two bits on the LSB side of the pixel value. However, the tap pattern code may also be recorded or transmitted separately from the pixel value.

Also, in the above-described embodiment, the prediction coefficients are updated by using the optimum SD picture which is preprocessed by the preprocessing section 21 and optimized by the optimizing section 23, and the tap pattern code is re-defined by using the updated prediction coefficients. However, the optimum SD picture which is preprocessed by the preprocessing section 21 and optimized by the optimizing section 23 may be directly used as coded data. In this case, though the picture quality (S/N) of the decoded picture is slightly deteriorated in comparison with the case where the tap pattern code is re-defined, high-speed processing may be realized.

Also, in the above-described embodiment, the four patterns of prediction taps of 3×3 pixels, 5×3 pixels, 3×5 pixels, and 7×5 pixels are used. However, other prediction taps such as prediction taps of 1×5 pixels and 5×1 pixels may also be used. The patterns of prediction taps are not limited to four types.

Although not particularly referred to in the embodiment, after the tap pattern code is appended to the pixel value, the two bits on the LSB side to which the tap pattern code is appended may be caused to have a predetermined value and then used as the pixel value. Also, the tap pattern code may be included as the pixel value for carrying out processing. According to an experiment conducted by the present Inventor, in the case where the tap pattern code is included in the pixel value, though the S/N ratio is slightly deteriorated in comparison with the case where the part of the tap pattern code is caused to be a predetermined value of 0, the gradation is slightly improved.

Figure 15:
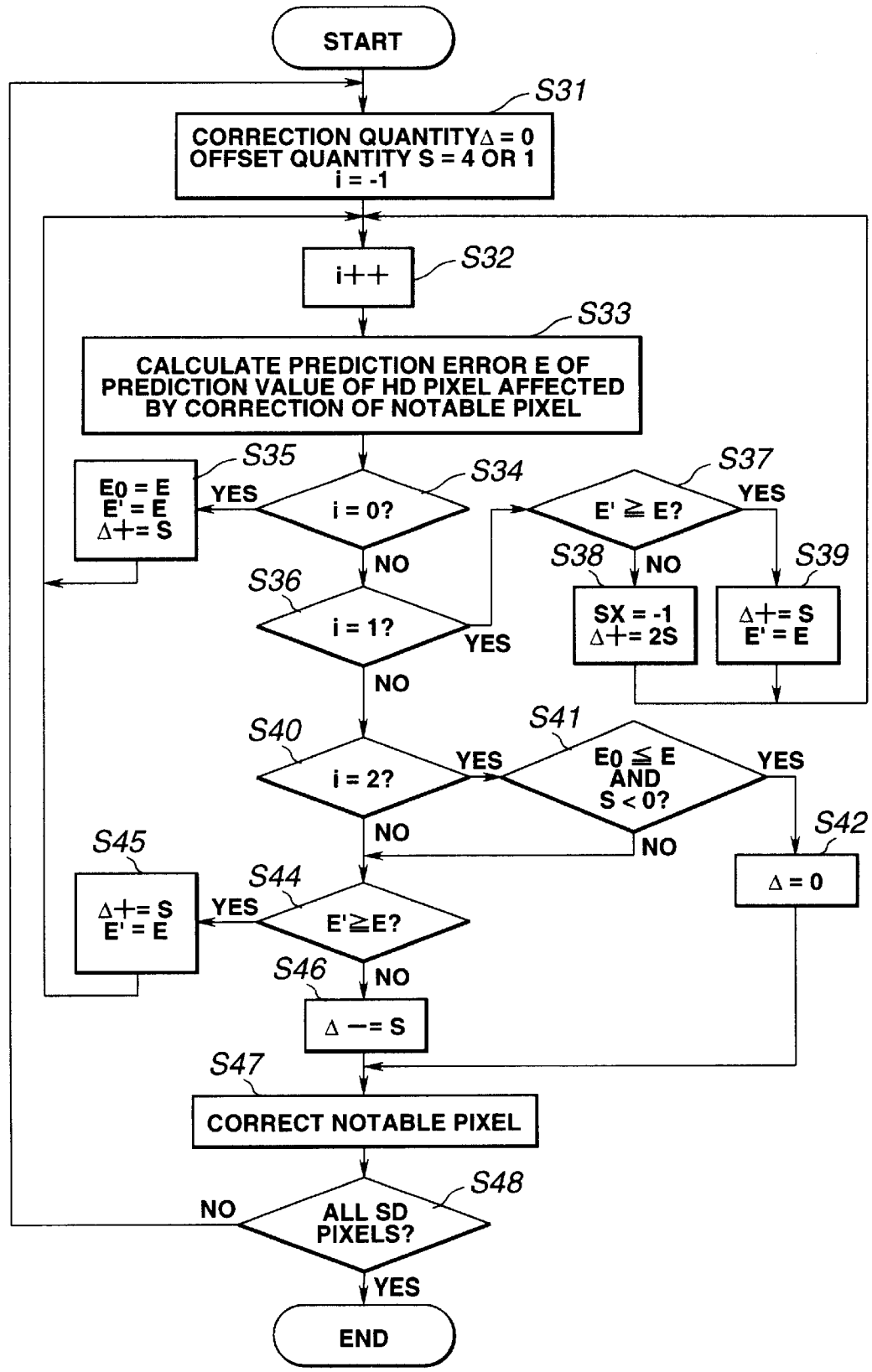
FIG. 15 is a flowchart for explaining the processing of the optimizing section 23 of FIG. 14.

In FIG. 15, the correction quantity $\Delta$ which first minimizes the prediction error E is detected by correcting the pixel value of the notable pixel by 4 or 1 as the offset quantity S. However, it is also possible to find the prediction error E with respect to all the possible pixel values of the notable pixel, then detect the minimum value thereof, and correct the pixel value of the notable pixel by the correction quantity $\Delta$. In this case, though processing is time-consuming, a decoded picture having a high S/N ratio may be obtained.

In addition, in the case where the prediction error E is thus found with respect to all the possible pixel values of the notable pixel, the initial value of the pixel value of the notable pixel may be any value (as long as it is within the range of possible pixel values of the notable pixel). That is, in this case, whatever value the initial value is, the correction value $\Delta$ which minimizes the prediction error E may be found.

Industrial Applicability

In the picture encoding device and the picture encoding method according to the present invention, a compressed picture signal having a number of pixels smaller than the number of pixels of an original picture signal is generated, and plural patterns of prediction pixels are formed by using neighboring pixels of a notable pixel which is one of pixels constituting the compressed picture signal. The original picture signal is predicted from each of the plural patterns of prediction pixels and a predetermined prediction coefficient, and each of prediction values with respect to the plural patterns of prediction pixels is outputted. A prediction error of each of the prediction values of the plural patterns of prediction pixels with respect to the original picture signal is calculated, and a pattern code corresponding to a prediction pixel with which a minimum prediction error is obtained, among the plural patterns of prediction pixels, is appended to the pixel value of the notable pixel. Thus, by forming a prediction tap in accordance with the pattern code and carrying out decoding, a decoded picture of improved picture quality may be obtained.

In the picture decoding device and the picture decoding method according to the present invention, a compressed picture signal is received, and a prediction picture of a pattern corresponding to a pattern code appended to the pixel value of a notable pixel of the compressed picture signal is formed. An original picture signal is predicted from the prediction picture formed by the formation section and a predetermined prediction coefficient, and the original picture signal is outputted. Thus, a prediction value more proximate to the original picture may be obtained.

On the recording medium according to the present invention, a compressed picture signal decodable by a picture decoding device is recorded. This compressed picture signal is formed by generating a compressed picture signal having a number of pixels smaller than the number of pixels of an original picture signal, forming plural patterns of prediction pixels by using neighboring pixels of a notable pixel which is one of pixels constituting the compressed picture signal, predicting the original picture signal from each of the plural patterns of prediction pixels and a predetermined prediction coefficient and outputting each of prediction values with respect to the plural patterns of prediction pixels, calculating a prediction error of each of the prediction values of the plural patterns of prediction pixels with respect to the original picture signal, and appending a pattern code corresponding to a prediction pixel with which a minimum prediction error is obtained, among the plural patterns of prediction pixels, to the pixel value of the notable pixel. Thus, by forming a prediction tap in accordance with the pattern code and carrying out decoding, a decoded picture of improved picture quality may be obtained.

It is to be understood that various modifications and changes may be effected without departing from the scope of the present invention. Thus, the scope of the present invention is not limited to the embodiment.

What is claimed is:

1. A picture encoding device for encoding a picture signal, comprising:
    a compressing means for generating a compressed picture signal from an original picture signal;
    a forming means for forming plural patterns of prediction pixels by using neighboring pixels of a notable pixel which is one of pixels constituting the compressed picture signal;
    a predicting means for predicting the original picture signal from each of the plural patterns of prediction pixels and a predetermined prediction coefficient and outputting each of prediction values with respect to the plural patterns of prediction pixels;
    a calculating means for calculating a prediction error of each of the prediction values of the plural patterns of prediction pixels with respect to the original picture signal; and
    an appending section for appending a pattern code corresponding to a prediction pixel with which a minimum prediction error is obtained, from among the plural patterns of prediction pixels, to the pixel value of the notable pixel.

2. The picture encoding device as claimed in claim 1, further comprising an optimizing section for converting the compressed picture signal to an optimum compressed signal.

3. The picture encoding device as claimed in claim 1, further comprising an output means for outputting the compressed picture signal and the predetermined prediction coefficient.

4. The picture encoding device as claimed in claim 1, wherein the appending means locates the pattern code in place of N bits on a LSB (Least Significant Bit) side of the pixel value of the notable pixel.

5. The picture encoding device as claimed in claim 4, further comprising an optimizing section for converting the compressed picture signal to an optimum compressed signal.

6. The picture encoding device as claimed in claim 4, further comprising an optimizing means for converting the compressed picture signal to an optimum compressed picture signal,
    the optimizing means comprising:
        a second forming means for forming a pattern of prediction pixel corresponding, to the pattern code appended to the pixel value of the notable pixel;
        a second predicting means for predicting the original picture signal from the prediction pixel formed by the second forming means and the predetermined prediction coefficient and outputting a prediction value of the original picture signal;
        a second calculating means for calculating a prediction error of the prediction value of the original picture signal predicted by the second predicting means, with respect to the original picture signal; and
        a correcting means for correcting the pixel value of the notable pixel in accordance with the prediction error calculated by the second calculating means.

7. The picture encoding device as claimed in claim 1, further comprising an optimizing means for converting the compressed picture signal to an optimum compressed picture signal,
    the optimizing means comprising:
        a second forming means for forming a pattern of prediction pixel corresponding to the pattern code appended to the pixel value of the notable pixel;
        a second predicting means for predicting the original picture signal from the prediction pixel formed by the second forming means and the predetermined prediction coefficient and outputting a prediction value of the original picture signal;
        a second calculating means for calculating a prediction error of the prediction value of the original picture signal predicted by the second predicting means, with respect to the original picture signal; and
        a correcting means for correcting the pixel value of the notable pixel in accordance with the prediction error calculated by the second calculating means.

8. The picture encoding device as claimed in claim 7, wherein the optimizing means repeats the operation of the second optimizing section until the compressed picture becomes the optimum compressed picture signal.

9. The picture encoding device as claimed in claim 8, further comprising a modifying means for modifying the predetermined prediction coefficient so that the prediction error of the prediction value of the original picture signal predicted by the second predicting means with respect to the original picture signal is reduced on the basis of a compressed picture signal in repeat operation of the optimizing means and the original picture signal during the repeat operation, and outputting the modified predetermined prediction coefficient,
    wherein the first predicting means and the second predicting means predict the prediction value by using the modified predetermined prediction coefficient.

10. The picture encoding device as claimed in claim 9, further comprising an output means for outputting the compressed picture signal and the predetermined prediction coefficient.

11. The picture encoding device as claimed in claim 1, wherein the predicting means has an arithmetic section for calculating the predetermined prediction coefficient on the basis of the original picture signal and the compressed picture signal.

12. The picture encoding device as claimed in claim 11, further comprising an optimizing means for converting the compressed picture signal to an optimum compressed picture signal, the optimizing means comprising:
a second forming means for forming a pattern of prediction pixel corresponding to the pattern code appended to the pixel value of the notable pixel;
a second predicting means for predicting the original picture signal from the prediction pixel formed by the second forming means and the predetermined prediction coefficient and outputting a prediction value of the original picture signal;
a second calculating means for calculating a prediction error of the prediction value of the original picture signal predicted by the second predicting means, with respect to the original picture signal; and
a correcting means for correcting the pixel value of the notable pixel in accordance with the prediction error calculated by the second calculating means.

13. The picture encoding device as claimed in claim 11, further comprising an output means for outputting the compressed picture signal and the predetermined prediction coefficient.

14. The picture encoding device as claimed in claim 11, further comprising an optimizing section for converting the compressed picture signal to an optimum compressed signal.

15. The picture encoding device as claimed in claim 11, wherein the arithmetic means calculates the predetermined prediction coefficient with respect to each of the plural patterns of prediction pixels.

16. The picture encoding device as claimed in claim 15, further comprising an optimizing means for converting the compressed picture signal to an optimum compressed picture signal, the optimizing means comprising:
a second forming means for forming a pattern of prediction pixel corresponding to the pattern code appended to the pixel value of the notable pixel;
a second predicting means for predicting the original picture signal from the prediction pixel formed by the second forming means and the predetermined prediction coefficient and outputting a prediction value of the original picture signal;
a second calculating means for calculating a prediction error of the prediction value of the original picture signal predicted by the second predicting means, with respect to the original picture signal; and
a correcting means for correcting the pixel value of the notable pixel in accordance with the prediction error calculated by the second calculating means.

17. The picture encoding device as claimed in claim 15, further comprising an output means for outputting the compressed picture signal and the predetermined prediction coefficient.

18. The picture encoding device as claimed in claim 15, further comprising an optimizing section for converting the compressed picture signal to an optimum compressed signal.

19. The picture encoding device as claimed in claim 11, wherein the predicting means has a classifying section for classifying the notable pixel into a predetermined class, the arithmetic means calculating the predetermined prediction coefficient for every class on the basis of the original picture signal and the compressed picture signal, the predicting means predicting the prediction value from a prediction coefficient corresponding to the class of the notable pixel and a prediction tap.

20. The picture encoding device as claimed in claim 19, further comprising an optimizing means for converting the compressed picture signal to an optimum compressed picture signal, the optimizing means comprising:
a second forming means for forming a pattern of prediction pixel corresponding to the pattern code appended to the pixel value of the notable pixel;
a second predicting means for predicting the original picture signal from the prediction pixel formed by the second forming means and the predetermined prediction coefficient and outputting a prediction value of the original picture signal;
a second calculating means for calculating a prediction error of the prediction value of the original picture signal predicted by the second predicting means, with respect to the original picture signal; and
a correcting means for correcting the pixel value of the notable pixel in accordance with the prediction error calculated by the second calculating means.

21. The picture encoding device as claimed in claim 19, further comprising an output means for outputting the compressed picture signal and the predetermined prediction coefficient.

22. The picture encoding device as claimed in claim 19, further comprising an optimizing section for converting the compressed picture signal to an optimum compressed signal.

23. The picture encoding device as claimed in claim 19, wherein the arithmetic means calculates the predetermined coefficient for every class with respect to each of the plural patterns of prediction pixels, the predicting means predicting the prediction value from the prediction coefficient corresponding to the class of the notable pixel and the prediction tap, with respect to each of the plural patterns of prediction pixels.

24. The picture encoding device as claimed in claim 23, further comprising an optimizing section for converting the compressed picture signal to an optimum compressed signal.

25. The picture encoding device as claimed in claim 23, further comprising an optimizing means for converting the compressed picture signal to an optimum compressed picture signal, the optimizing means comprising:
a second forming means for forming a pattern of prediction pixel corresponding to the pattern code appended to the pixel value of the notable pixel;
a second predicting means for predicting the original picture signal from the prediction pixel formed by the second forming means and the predetermined prediction coefficient and outputting a prediction value of the original picture signal;
a second calculating means for calculating a prediction error of the prediction value of the original picture signal predicted by the second predicting means, with respect to the original picture signal; and
a correcting means for correcting the pixel value of the notable pixel in accordance with the prediction error calculated by the second calculating means.

26. The picture encoding device as claimed in claim 23, further comprising an output means for outputting the compressed picture signal and the predetermined prediction coefficient.

27. A picture encoding method for encoding a picture signal, comprising:

a compression step of generating a compressed picture signal from an original picture signal;

a formation step of forming plural patterns of prediction pixels by using neighboring pixels of a notable pixel which is one of pixels constituting the compressed picture signal;

a prediction step of predicting the original picture signal from each of the plural patterns of prediction pixels and a predetermined prediction coefficient and outputting each of prediction values with respect to the plural patterns of prediction pixels;

a calculation step of calculating a prediction error of each of the prediction values of the plural patterns of prediction pixels with respect to the original picture signal; and an appending step of appending a pattern code corresponding to a prediction pixel with which a minimum prediction error is obtained, from among the plural patterns of prediction pixels, to the pixel value of the notable pixel.

28. The picture encoding method as claimed in claim 27, further comprising an output step of outputting the compressed picture signal and the predetermined prediction coefficient.

29. The picture encoding method as claimed in claim 27, further comprising an optimization step of converting the compressed picture signal to an optimum compressed signal.

30. The picture encoding method as claimed in claim 27, wherein the appending step includes locating the pattern code in place of N bits on a LSB (Least Significant Bit) side of the pixel value of the notable pixel.

31. The picture encoding method as claimed in claim 30, further comprising an optimization step of converting the compressed picture signal to an optimum compressed picture signal, the optimization step including:

a second formation step of forming a pattern of prediction pixel corresponding to the pattern code appended to the pixel value of the notable pixel;

a second prediction step of predicting the original picture signal from the prediction pixel formed by the second formation step and the predetermined prediction coefficient and outputting a prediction value of the original picture signal;

a second calculation step of calculating a prediction error of the prediction value of the original picture signal predicted by the second prediction step, with respect to the original picture signal; and a correction step of correcting the pixel value of the notable pixel in accordance with the prediction error calculated by the second calculation step.

32. The picture encoding method as claimed in claim 30, further comprising an output step of outputting the compressed picture signal and the predetermined prediction coefficient.

33. The picture encoding method as claimed in claim 30, further comprising an optimization step of converting the compressed picture signal to an optimum compressed signal.

34. The picture encoding method as claimed in claim 27, further comprising an optimization step of converting the compressed picture signal to an optimum compressed picture signal, the optimization step including:

a second formation step of forming a pattern of prediction pixel corresponding to the pattern code appended to the pixel value of the notable pixel;

a second prediction step of predicting the original picture signal from the prediction pixel formed by the second formation step and the predetermined prediction coefficient and outputting a prediction value of the original picture signal;

a second calculation step of calculating a prediction error of the prediction value of the original picture signal predicted by the second prediction step, with respect to the original picture signal; and a correction step of correcting the pixel value of the notable pixel in accordance with the prediction error calculated by the second calculation step.

35. The picture encoding method as claimed in claim 34, wherein the optimization step repeats the operation of the second optimization step until the compressed picture becomes the optimum compressed picture signal.

36. The picture encoding method as claimed in claim 35, further comprising a modification step of modifying the predetermined prediction coefficient so that the prediction error of the prediction value of the original picture signal predicted by the second prediction step with respect to the original picture signal is reduced on the basis of a compressed picture signal in repeat operation of the optimization step and the original picture signal during the repeat operation, and outputting the modified predetermined prediction coefficient, wherein the first prediction step and the second prediction step includes predicting the prediction value by using the modified predetermined prediction coefficient.

37. The picture encoding method as claimed in claim 36, further comprising an output step of outputting the compressed picture signal and the predetermined prediction coefficient.

38. The picture encoding method as claimed in claim 27, wherein the prediction step has an arithmetic step of calculating the predetermined prediction coefficient on the basis of the original picture signal and the compressed picture signal.

39. The picture encoding method as claimed in claim 38, further comprising an optimization step of converting the compressed picture signal to an optimum compressed picture signal, the optimization step including:

a second formation step of forming a pattern of prediction pixel corresponding to the pattern code appended to the pixel value of the notable pixel;

a second prediction step of predicting the original picture signal from the prediction pixel formed by the second formation step and the predetermined prediction coefficient and outputting a prediction value of the original picture signal;

a second calculation step of calculating a prediction error of the prediction value of the original picture signal predicted by the second prediction step, with respect to the original picture signal; and a correction step of correcting the pixel value of the notable pixel in accordance with the prediction error calculated by the second calculation step.

40. The picture encoding method as claimed in claim 38, further comprising an output step of outputting the compressed picture signal and the predetermined prediction coefficient.

41. The picture encoding method as claimed in claim 38, further comprising an optimization step of converting the compressed picture signal to an optimum compressed signal.

42. The picture encoding method as claimed in claim 38, wherein the prediction step has a classification step of classifying the notable pixel into a predetermined class, the arithmetic step including calculating the predetermined prediction coefficient for every class on the basis of the original picture signal and the compressed picture signal, the prediction step including predicting the prediction value from a prediction coefficient corresponding to the class of the notable pixel and a prediction tap.

43. The picture encoding method as claimed in claim 42, further comprising an optimization step of converting the compressed picture signal to an optimum compressed picture signal, the optimization step including:

a second formation step of forming a pattern of prediction pixel corresponding to the pattern code appended to the pixel value of the notable pixel;

a second prediction step of predicting the original picture signal from the prediction pixel formed by the second formation step and the predetermined prediction coefficient and outputting a prediction value of the original picture signal;

a second calculation step of calculating a prediction error of the prediction value of the original picture signal predicted by the second prediction step, with respect to the original picture signal; and a correction step of correcting the pixel value of the notable pixel in accordance with the prediction error calculated by the second calculation step.

44. The picture encoding method as claimed in claim 42, further comprising an output step of outputting the compressed picture signal and the predetermined prediction coefficient.

45. The picture encoding method as claimed in claim 42, further comprising an optimization step of converting the compressed picture signal to an optimum compressed signal.

46. The picture encoding method as claimed in claim 38, wherein the arithmetic step includes calculating the predetermined prediction coefficient with respect to each of the plural patterns of prediction pixels.

47. The picture encoding method as claimed in claim 46, further comprising in optimization step of converting the compressed picture signal to an optimum compressed picture signal, the optimization step including:

a second formation step of forming a pattern of prediction pixel corresponding to the pattern code appended to the pixel value of the notable pixel;

a second prediction step of predicting the original picture signal from the prediction pixel formed by the second formation step and the predetermined prediction coefficient and outputting a prediction value of the original picture signal;

a second calculation step of calculating a prediction error of the prediction value of the original picture signal predicted by the second prediction step, with respect to the original picture signal; and a correction step of correcting the pixel value of the notable pixel in accordance with the prediction error calculated by the second calculation step.

48. The picture encoding method as claimed in claim 46, further comprising an output step of outputting the compressed picture signal and the predetermined prediction coefficient.

49. The picture encoding method as claimed in claim 46, further comprising an optimization step of converting the compressed picture signal to an optimum compressed signal.

50. The picture encoding method as claimed in claim 42, wherein the arithmetic step includes calculating the predetermined coefficient for every class with respect to each of the plural patterns of prediction pixels, the prediction step including predicting the prediction value from the prediction coefficient corresponding to the class of the notable pixel and the prediction tap, with respect to each of the plural patterns of prediction pixels.

51. The picture encoding method as claimed in claim 50, further comprising an optimization step of converting the compressed picture signal to an optimum compressed picture signal, the optimization step including:

a second formation step of forming a pattern of prediction pixel corresponding to the pattern code appended to the pixel value of the notable pixel;

a second prediction step of predicting the original picture signal from the prediction pixel formed by the second formation step and the predetermined prediction coefficient and outputting a prediction value of the original picture signal;

a second calculation step of calculating a prediction error of the prediction value of the original picture signal predicted by the second prediction step, with respect to the original picture signal; and a correction step of correcting the pixel value of the notable pixel in accordance with the prediction error calculated by the second calculation step.

52. The picture encoding method as claimed in claim 50, further comprising an output step of outputting the compressed picture signal and the predetermined prediction coefficient.

53. The picture encoding method as claimed in claim 50, further comprising an optimization step of converting the compressed picture signal to an optimum compressed signal.

54. The picture encoding device of claim 1, wherein said compressed picture signal has a number of pixels smaller than a number of pixels of said original picture signal.

55. The picture encoding method of claim 27, wherein said compressed picture signal has a number of pixels smaller than a number of pixels of said original picture signal.

* * * * *